US009843774B2

(12) United States Patent
Upendran et al.

(10) Patent No.: US 9,843,774 B2
(45) Date of Patent: Dec. 12, 2017

(54) SYSTEM AND METHOD FOR IMPLEMENTING AN AD MANAGEMENT SYSTEM FOR AN EXTENSIBLE MEDIA PLAYER

(75) Inventors: Manish Upendran, San Jose, CA (US); Allen De La Cruz, Somerville, MA (US); Tomi Blinnikka, San Pablo, CA (US); Pavel Murnikov, Cambridge, MA (US)

(73) Assignee: Excalibur IP, LLC, Sunnyvale, CA (US)

( * ) Notice: Subject to any disclaimer, the term of this patent is extended or adjusted under 35 U.S.C. 154(b) by 2591 days.

(21) Appl. No.: 12/185,040

(22) Filed: Aug. 1, 2008

(65) Prior Publication Data
US 2009/0106104 A1  Apr. 23, 2009

Related U.S. Application Data

(63) Continuation-in-part of application No. 12/165,290, filed on Jun. 30, 2008, and a continuation-in-part of application No. 11/874,171, filed on Oct. 17, 2007.

(51) Int. Cl.
*G06Q 40/00* (2012.01)
*H04N 7/173* (2011.01)
(Continued)

(52) U.S. Cl.
CPC ..... *H04N 7/17318* (2013.01); *G06Q 30/0252* (2013.01); *H04N 21/4312* (2013.01);
(Continued)

(58) Field of Classification Search
CPC ......... G06Q 40/02; G06Q 40/04; G06Q 40/06
(Continued)

(56) References Cited

U.S. PATENT DOCUMENTS 7,219,308 B2  5/2007  Novak et al.
7,373,604 B1  5/2008  Asch
(Continued)

OTHER PUBLICATIONS

Bulterman D, "SMIL 2.0.2. Examples and Comparisons IEEE Multimedia" vol. 9, No. 1, 11 pages, dated 2002.
(Continued)

*Primary Examiner* — Bruce I Ebersman
*Assistant Examiner* — John Anderson
(74) *Attorney, Agent, or Firm* — Hickman Palermo Becker Bingham LLP

(57) ABSTRACT

In a method and system for creating an extensible media player, a multimedia player application is instantiated on a client system. A presentation data file is transmitted to the client system from a server. The presentation data file includes a playlist of timelines, with at least one multimedia file being played or at least one application being executed for each timeline. The presentation data file is parsed to activate an advertising manager module. The activated advertising manager module instantiates an advertising plug-in. The advertising plug-in connects to an advertising network and downloads select advertising policies and dynamically schedules advertisements for the timelines. Upon the occurrence of an event generated by a timeline, the advertising manager module inserts a blocking module to block execution of the timeline. An advertisement is dynamically retrieved and rendered in an advertising display overlaying a multimedia player application display. When the advertisement has concluded, execution of the timeline is resumed.

27 Claims, 21 Drawing Sheets

(51) Int. Cl.
*G06Q 30/02* (2012.01)
*H04N 21/431* (2011.01)
*H04N 21/433* (2011.01)
*H04N 21/458* (2011.01)
*H04N 21/482* (2011.01)
*H04N 21/81* (2011.01)

(52) U.S. Cl.
CPC ..... *H04N 21/4314* (2013.01); *H04N 21/4331* (2013.01); *H04N 21/458* (2013.01); *H04N 21/4825* (2013.01); *H04N 21/812* (2013.01)

(58) Field of Classification Search
USPC ............................ 705/35, 14.4, 14.72, 14.73
See application file for complete search history.

(56) References Cited

U.S. PATENT DOCUMENTS

| | | | |
|---|---|---|---|
| 7,743,329 B2 | 6/2010 | Rahman et al. | |
| 7,769,829 B1 | 8/2010 | Riggs et al. | |
| 2002/0104096 A1* | 8/2002 | Cramer | H04N 7/17318 725/113 |
| 2002/0156909 A1 | 10/2002 | Harrington | |
| 2003/0145338 A1 | 7/2003 | Harrington | |
| 2003/0220830 A1* | 11/2003 | Myr | G06Q 10/06 705/14.54 |
| 2003/0236907 A1 | 12/2003 | Stewart et al. | |
| 2003/0237043 A1 | 12/2003 | Novak et al. | |
| 2004/0267899 A1 | 12/2004 | Rahman et al. | |
| 2005/0132305 A1* | 6/2005 | Guichard et al. | 715/855 |
| 2005/0160113 A1 | 7/2005 | Sipusic et al. | |
| 2006/0044664 A1 | 3/2006 | Kelly et al. | |
| 2006/0129916 A1 | 6/2006 | Volk et al. | |
| 2006/0129917 A1 | 6/2006 | Volk et al. | |
| 2006/0182418 A1 | 8/2006 | Yamagata et al. | |
| 2006/0236219 A1 | 10/2006 | Grigorovitch | |
| 2007/0079228 A1 | 4/2007 | Ando et al. | |
| 2007/0213857 A1 | 9/2007 | Bodin et al. | |
| 2007/0220118 A1 | 9/2007 | Loyer | |
| 2007/0276866 A1 | 11/2007 | Bodin et al. | |
| 2008/0005179 A1 | 1/2008 | Friedman et al. | |
| 2008/0319856 A1* | 12/2008 | Zito et al. | 705/14 |
| 2009/0013347 A1* | 1/2009 | Ahanger | G06Q 30/02 725/36 |
| 2010/0030578 A1* | 2/2010 | Siddique et al. | 705/3 |

OTHER PUBLICATIONS

U.S. Appl. No. 11/874,171, filed Oct. 17, 2007, Office Action, dated Sep. 16, 2011.
Harris, Simon et al., "Beginning Algotithms", dated Nov. 7, 2005, Wrox., 3 pages.
U.S. Appl. No. 12/355,661, filed Jan. 16, 2009, Final Office Action, dated Jul. 29, 2014.
Fleischman, Eric, Advanced Streaming Format (ASF) Specification, dated Jan. 9, 1998, 3 pages.
U.S. Appl. No. 12/355,661, filed Jan. 16, 2009, Final Office Action, dated Apr. 24, 2013.
Bulterman, D. et al., "Synchronized Multimedia Integration Language (SMIL 2.1)" *W3C Recommendation* Dec. 13, 2005 (421 pages).
U.S. Appl. No. 12/355,661, filed Jan. 16, 2009, Office Action, dated Dec. 18, 2013.
U.S. Appl. No. 12/355,661, filed Jan. 16, 2009, Office Action, dated Jan. 8, 2014.

* cited by examiner

100

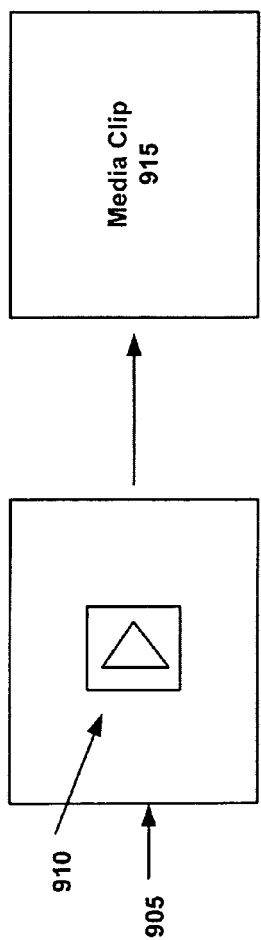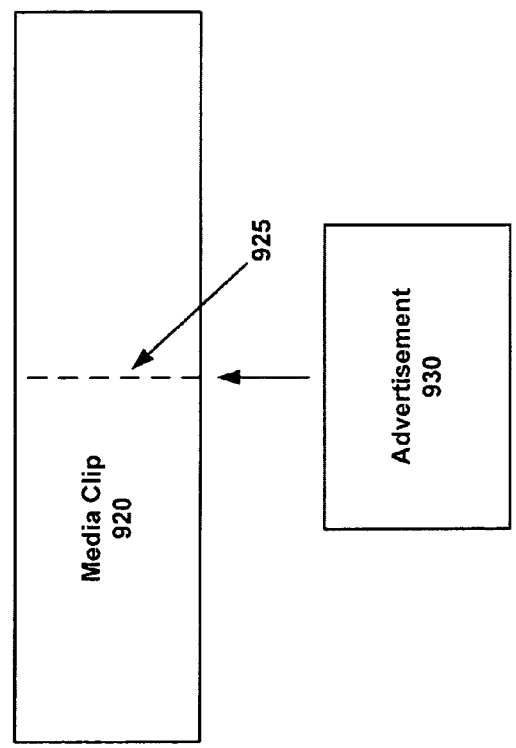
FIG. 9A
FIG. 9B

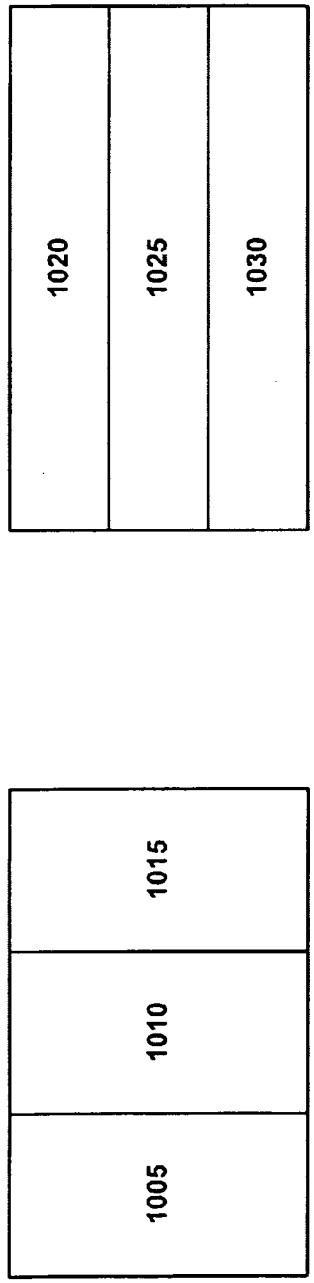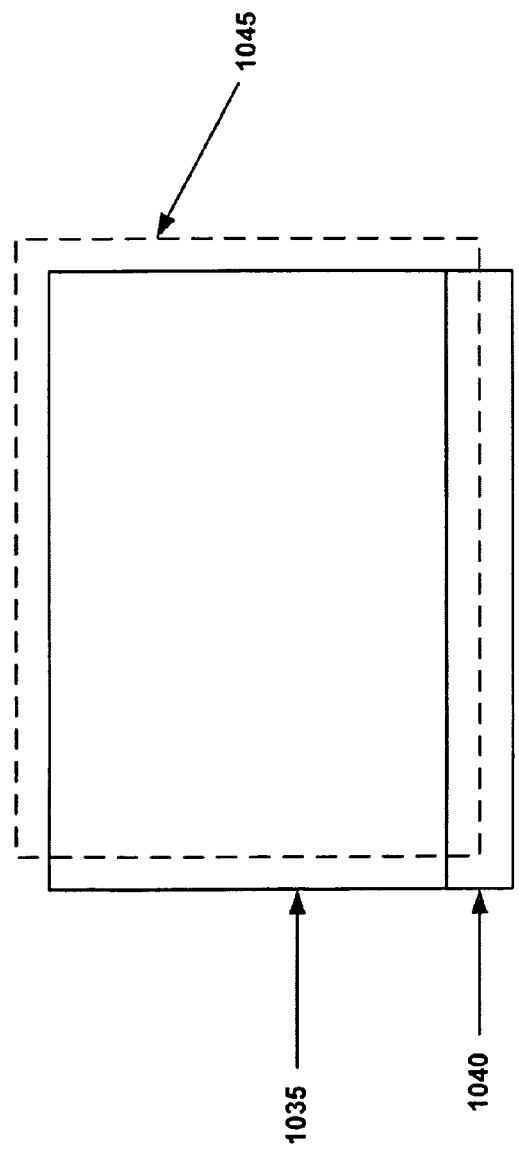
FIG. 10A
FIG. 10B
FIG. 10C

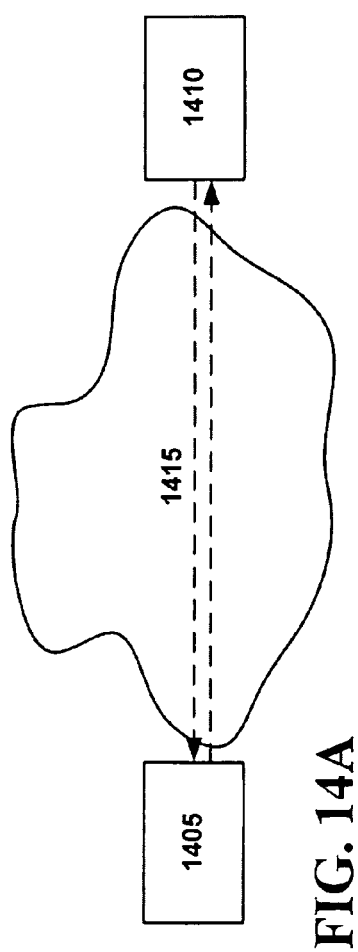
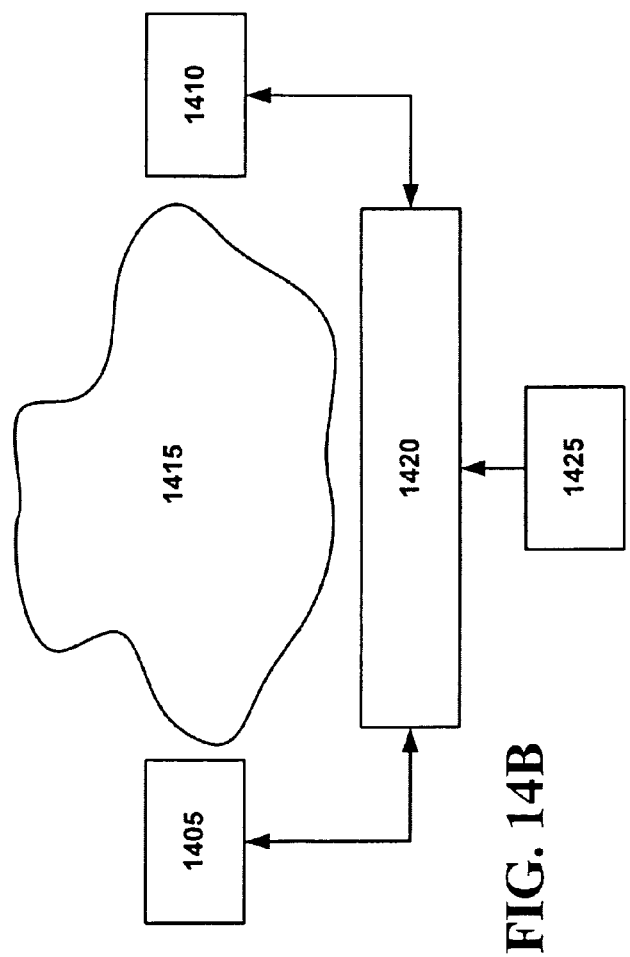

SYSTEM AND METHOD FOR IMPLEMENTING AN AD MANAGEMENT SYSTEM FOR AN EXTENSIBLE MEDIA PLAYER

CROSS-REFERENCE TO RELATED APPLICATIONS

The present application is a continuation-in-part of application Ser. No. 12/165,290, filed Jun. 30, 2008, entitled, "Extensions for System and Method for an Extensible Media Player", which is a continuation-in-part of application Ser. No. 11/874,171, filed Oct. 17, 2007, entitled, "System and Method for an Extensible Media Player". The present application incorporates these earlier-filed applications by reference.

BACKGROUND

Field of the Invention

Aspects of the present invention relate generally to a media player, and more particularly, to an extensible media player.

Description of Related Art

Current media player solutions found on Internet web pages are designed and written like most computer applications. When a new feature is to be added to the media player, the feature must be written into the main media player application, essentially requiring a full product cycle. This increases the deployment time of the media player.

Current media player solutions also fail to provide a fully dynamic system to program the user experience on-the-fly. While solutions exist to render different visual items based on cue points within the media being played or based on pre-defined criteria, these items are fixed and must be pre-programmed with the media being played.

Thus, it would be desirable to provide a method and system for creating an extensible media player capable of being modified dynamically to provide a highly interactive experience for a user.

SUMMARY

Embodiments of the present invention overcome the above-mentioned and various other shortcomings of conventional technology, providing a method and system for creating an extensible media player.

In accordance with one aspect, a media player application may be instantiated on a client system. A presentation data file may be transmitted to the client system from a server. The presentation data file includes a playlist of timelines, with at least one multimedia file being played or at least one application being executed for each timeline. The presentation data file may be parsed to activate an advertising manager module. The activated advertising manager module may instantiate an advertising plug-in. The advertising plug-in may connect to an advertising network, download select advertising policies, and dynamically schedule advertisements for the timelines. Upon the occurrence of an event generated by a timeline, the advertising manager module may insert a blocking module to block execution of the timeline. While the timeline is blocked, an advertisement may be dynamically retrieved and rendered in an advertising display overlaying a multimedia player application display. When the advertisement has concluded, execution of the timeline may be resumed.

The foregoing and other aspects of various embodiments of the present invention will be apparent through examination of the following detailed description thereof in conjunction with the accompanying drawing figures.

BRIEF DESCRIPTION OF THE DRAWING FIGURES

FIG. 9A illustrates an embodiment involving the use of a blocking module.

FIG. 9B illustrates an embodiment involving the use of a blocking module.

FIG. 9 illustrates an embodiment of an extensible media player.

FIG. 10A illustrates an embodiment of a layout container.

FIG. 10B illustrates an embodiment of a layout container.

FIG. 10C illustrates an embodiment of a layout container.

FIG. 14A illustrates an embodiment for module communication.

FIG. 14B illustrates an embodiment for module communication.

DETAILED DESCRIPTION

Figure 1:
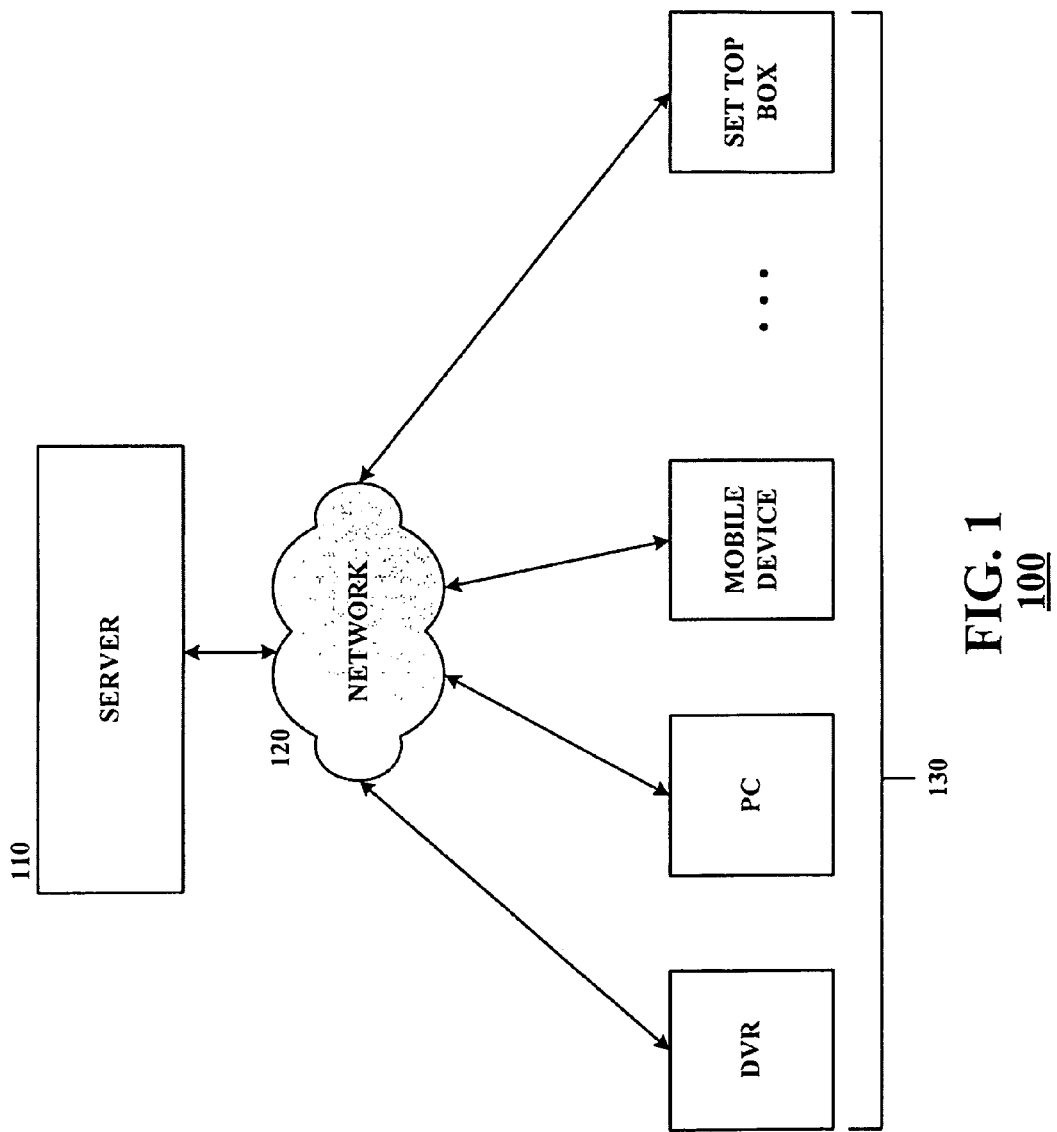
FIG. 1 is a simplified diagram illustrating an embodiment of a system for providing an extensible media player.

FIG. 1 is a simplified diagram illustrating one embodiment of a system for providing an extensible media player. The system 100 includes one or more servers storing a plurality of media files. The media files may be encoded in any format, including but not limited to the mpeg, avi, wmv, wma, mov, wav, mp3, aau, m4a, m4p, MIDI, and DivX formats. Various other encoding formats may be used advantageously with the embodiments described herein below; differences between these formats are immaterial to the present discussion unless otherwise noted. The servers also may store a player application, which may be passed to a plurality of client devices, and a plurality of modules, each of which may extend a functionality aspect or presentation aspect of the player application. Each module may include visual items, application logic, or a combination of the two. The servers may create and store a presentation data file based on user requests and third party requests, such as requests from content providers and advertisers. The presentation data file also may be created editorially. The presentation data file may be a XML-based file, such as, for example, a Media RSS (MRSS) file with extensions for the player application. The presentation data file may define the media items available to be played by the player application, as well as the player application components (i.e., modules) to be displayed for each media item. The presentation data file also may specify when each module associated with each media item becomes active and inactive, as well as the location of each module in the media player application. The presentation data file may be transmitted to any of the plurality of client devices.

The system also may include a plurality of client devices capable of instantiating or executing a media player application to play a media file, such as a video file or an audio file. The devices may include but are not limited to personal computers, digital video recorders (DVRs) or personal video recorders (PVRs), set top boxes which may receive content through cable, satellite, or Internet Protocol via network infrastructure including but not limited to wireless media and fiber optic cable (e.g., IPTV or Internet television), and mobile devices, such as cell phones, personal digital assistants (PDAs), or other wireless devices capable of playing video files. Each device may include software to process and play media files. The software may comprise a standalone media player capable of playing media files and parsing the presentation data file to execute modules. Alternatively, the software may include an Internet browser or other software in which the media player application, in the form of, for example, a Java applet or Flash-based player, may be instantiated or embedded. A client device may be configured to send a request through a network to the server to access one of the media files presented in the presentation data file. In response to a request from a connected device, a server may stream or transfer the selected media file(s) and accompanying modules associated with the selected media file over a network to the requesting device.

Figure 2:
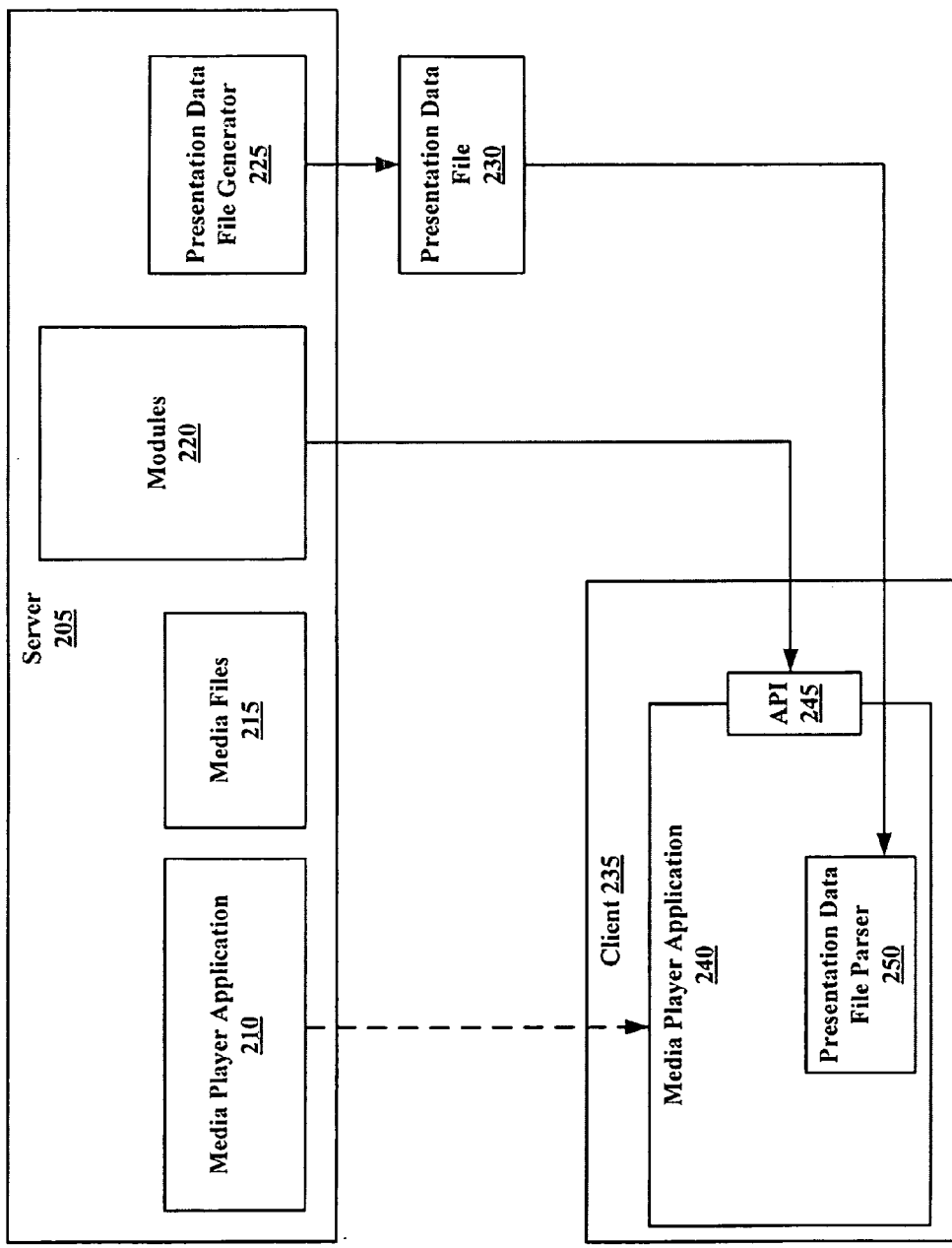
FIG. 2 illustrates an embodiment of an extensible media player system.

FIG. 2 illustrates an embodiment of a system for providing an extensible media player. The system may include a server 205 connected, in one embodiment, through a wired or wireless network, to a client device 235, such as a personal computer or portable communications device (e.g., a wireless telephone or Personal Digital Assistant (PDA)). The server 205 may store a media player application 210 or software code for implementing or instantiating a media player application on the client device 235, one or more media files 215, and one or more modules 220. The server 205 also may store presentation data files or include a presentation data file generator 225 which generates presentation data files.

The media files 215 may have any video or audio or mixed video/audio format, including but not limited to the types mentioned earlier. The particular format of the media files 215 stored in the server 205 is immaterial for the purposes of the present discussion, unless otherwise noted. The media files need not be stored in only one server, and may be stored in multiple servers. The one or more modules may provide additional player functionality or presentation features for the media player application. Examples of modules may include but are not limited to a player controls module, a playlist module to display available media files, a pre-timeline curtain module to display an advertisement prior to a media file, a banner to display a presentation aspect during playing of a media file, a post-roll curtain to display a presentation aspect subsequent to the playing of a media file, and a container to display third party content. Generally, modules may be designed and stored to interface with the media player application prior to, during, or subsequent to the playback of a media file. The modules may control an aspect of the playback of media files or may affect an aspect of the presentation of the media player application to a user.

The modules related to presentation aspects of the media player application may either transparently overlay or fully obscure part or all of the media file being played. Each module may have a default aspect ratio of 4:3, but may have logic necessary to conform to other aspect ratios, such as 16:9. Each module also may be resizable to any size. The modules may be configured to retrieve additional data from remote sources, such as the server, if needed, or to record and transmit usage information to the remote source. For example, if a closed captioning module is associated with a media file, the closed captioning module may retrieve the closed captioning data from a remote source to present to a user. The modules 220 also may be interactive, thereby enabling the user to control presentation of the media file or to access additional related content presented to the user before, during, or after presentation of the media file. In one embodiment, the media player application 240 and the modules 220 may be Flash-based components conforming to a specific version of Flash, including but not limited to, Flash 9. The container module may enable non-Flash third party content or third party content not conforming to a specific version of Flash to be displayed in conjunction with the media file being played in the media player application.

The presentation data files, either stored in the server 205 or generated by the presentation data file generator 225, may define a set of available media files to be played (i.e., a playlist) as well as media player application components 220 (i.e., modules) to be executed or displayed for each media item of the playlist. The presentation data file may further define the modules 220 by defining the ordering and timing of the modules 220 for a given media file (i.e., when a module is active and inactive). The timing of the modules 220 may be expressed as a function of time, events, or elapsed frames of the media file with which the module is associated. For modules 220 relating to the presentation of the media file to a user, the presentation data file also may specify the location and placement of the module within the media player application. The presentation data file may be a XML-based file such as a Media RSS (MRSS) file. Alternatively, the presentation data file may be a binary file. As a binary file may have a smaller file size than other file formats, the length of time to download a binary presentation data file may decrease, thereby improving performance of the system. A sample presentation data file is shown below:

---

<rss version="2.0" xmlns:media=http://search.yahoo.com/mrss
   xmlns:yemp="http://schemas.yahoo.com/yemp/">

```
        <channel>
            <!-- Modules that are used for all items -->
            <yemp:module start="0"
source="http://server.yahoo.com/yemp/modules/PlayerControls.swf"
            zIndex="9000" />
            <item>
                <yemp:module start="before"
source="http://server.yahoo.com/yemp/modules/StartFrame.swf"
parameters="src=http://server.yahoo.com/yemp/temp/
SampleThumbnail.jpg"
                zIndex="9000" />
                    <media:content
                        url="http://server.corp.yahoo.com/yemp/temp/test.flv"
                        type="video/x-flv">
                        <media:title>A ye olde TV Tuning</media:title>
                        <media:description>TV tuning video
clip</media:description>
                        <media:thumbnail
                            url="http://i.imdb.com/Photos/Mptv/1388/th-
5746_0077.jpg"
                            height="50" width="75" />
                    </media:content>
                <yemp:module start="after"
source="http://server.yahoo.com/yemp/modules/PostRoll.swf"
            </item>
        </channel>
    </rss>
```

The presentation data file may enable presentation aspects and application logic to be dynamically changed for a media file. For instance, the above sample presentation data file includes a player controls module, a start frame module, and a post-roll module. However, different modules may be substituted on-the-fly by modifying the presentation data file to call other modules. The placement or timing of the modules may be dynamically modified by changing the specifications for the various modules listed in the presentation data file, such as the "height," "width," and "module start" parameters.

The client device may execute a standalone media player application 240 or instantiate a media player application 240, within, for instance, an Internet browser. In one embodiment, the media player application 240 may be a Flash-based application. In one embodiment, the media player application 240 may be created as a Microsoft Silverlight™ application capable of playing WMV and WMA media files. The media player application 240 may serve as a platform for the extensible media player, and may include an Application Programming Interface (API) 245 which communicates with the various modules. In this respect, the API 245 may enable the modules 220 to interface with the player application 240 and control the presentation and playback aspects of the player application 240. In one embodiment, the player application API 245 may be public, thereby enabling distributed development of modules.

The presentation data file may be passed to the media player application from within a web page as a parameter or programmatically via JavaScript if the media player application is embedded on a web page. Alternatively, the presentation data file may be retrieved from the network by the media player application if the media player application is given or has knowledge of the source address of the presentation data file. A presentation data file parser 250 may parse the presentation data file 230 to reveal a playlist of media files available for playback. In one embodiment, the presentation data file parser 250 may be integrated into the media player application 240. In one embodiment, the playlist may list a set of FLV videos. An instance of the playlist may be passed to the instantiated or executed media player application, which may further parse the playlist to identify playlist items corresponding to available media files. Each playlist item may have a presentation instance that identifies the modules associated with the playlist item. The playlist items on the playlist may each include an address or link to the location where a corresponding media file 215 is stored. In response to the selection of a playlist item from the playlist, the player application 240 may transmit a request to the server 205 to download or stream the selected media file 215. While the embodiment discussed herein may identify a single server storing media files and modules, it is contemplated that multiple servers may be employed to store modules, media files, and, if the application is instantiated on a client device, an application SWF file. The present invention is not intended to be limited with respect to the number of servers employed, and it is conceivable that each component or aspect of the extensible media player may originate from or be located in a different location. Modules 220 associated with the selected media file also may be downloaded. In one embodiment, the modules 220 may be downloaded separately. Alternatively, the modules 220 may be packaged as one file at the server and downloaded to the client, thereby minimizing network traffic. Packaging the modules as one file may also reduce the load time of the modules, thereby improving the user viewing experience. The media player application 240 may load the selected media file 215 and the downloaded modules 245 for playback and presentation to the user.

Figure 3:
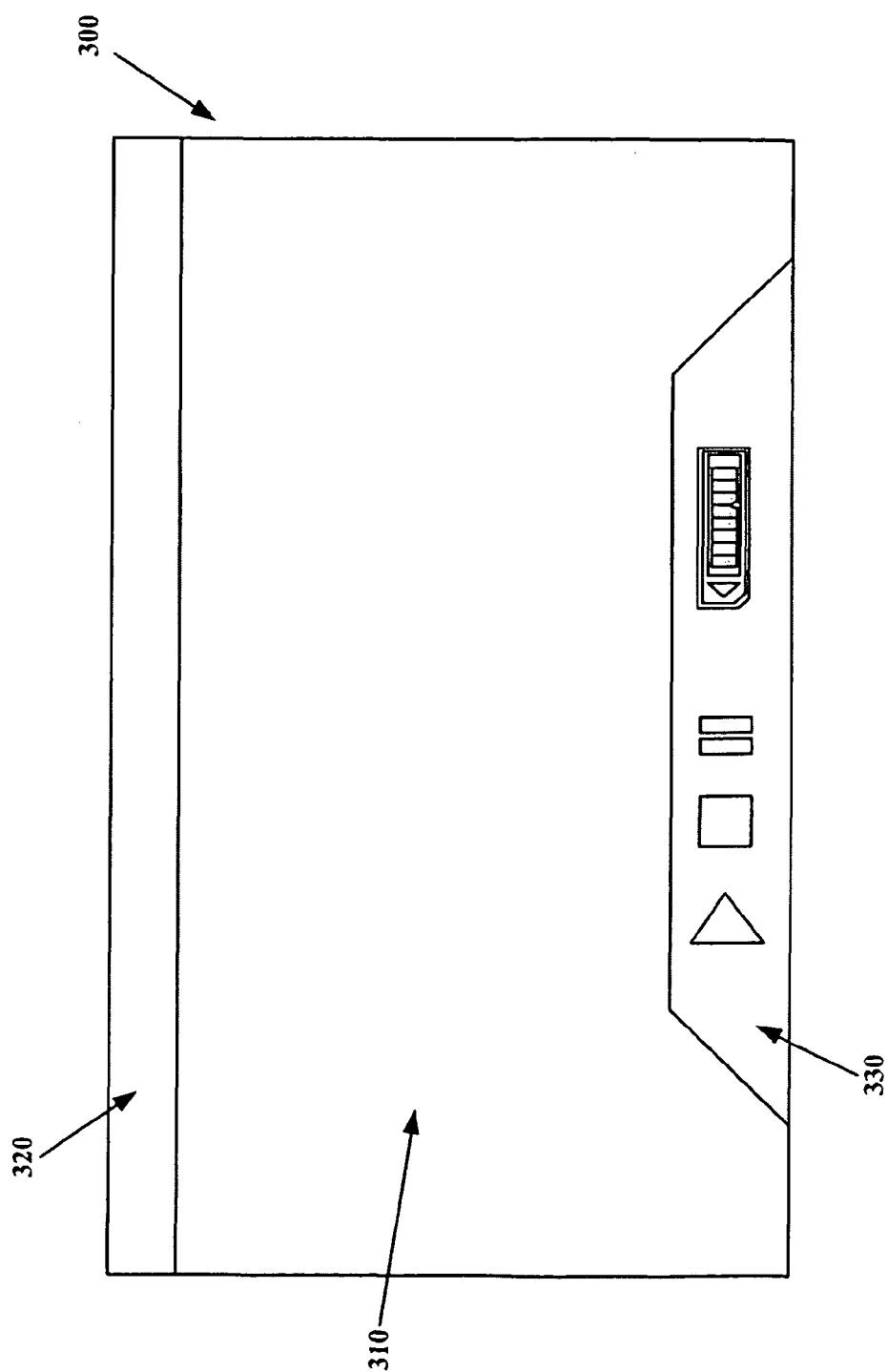
FIG. 3 illustrates an embodiment of an extensible media player application.

FIG. 3 illustrates an embodiment of an extensible media player. The media player application 300 may be instantiated in a client device, in, for instance, an Internet browser, or may function as a standalone media player application. The media player application 300 may be a Flash-based application. The media player application 300 may include a viewing screen 310 for displaying a selected media file. One or more modules associated with the selected media file may be downloaded and displayed prior to, concurrently with, or subsequent to the playing of the media file. In this embodiment, a banner module 320 may obscure the top portion of the video screen 310. The banner module 320 may display a banner advertisement concurrent to the playing of the selected media file. The placement and shape of the banner module 320 are not fixed; the banner module 320 may be placed anywhere in the video screen 310. In this embodiment, a player controls module 330 may transparently overlay the video screen 310 at the bottom of the video screen 310. The player controls module 330 may permit a user to control the playing of the selected media file. In this embodiment, the player controls module 330 may include a play button, a stop button, a pause button, and a volume adjustment control, but the player controls module 330 need not be limited to these controls and may include additional user controls.

In the event one or more of the modules fail to download or load properly, the instantiated or executed media player application 300 may nevertheless continue to operate without the failed module(s). As the modules provide additional functionality or presentation to the media player application, at a basic minimum, the extensible media player 300 may play the selected media file absent any of the modules, should the modules fail to download or load properly.

Figure 4:
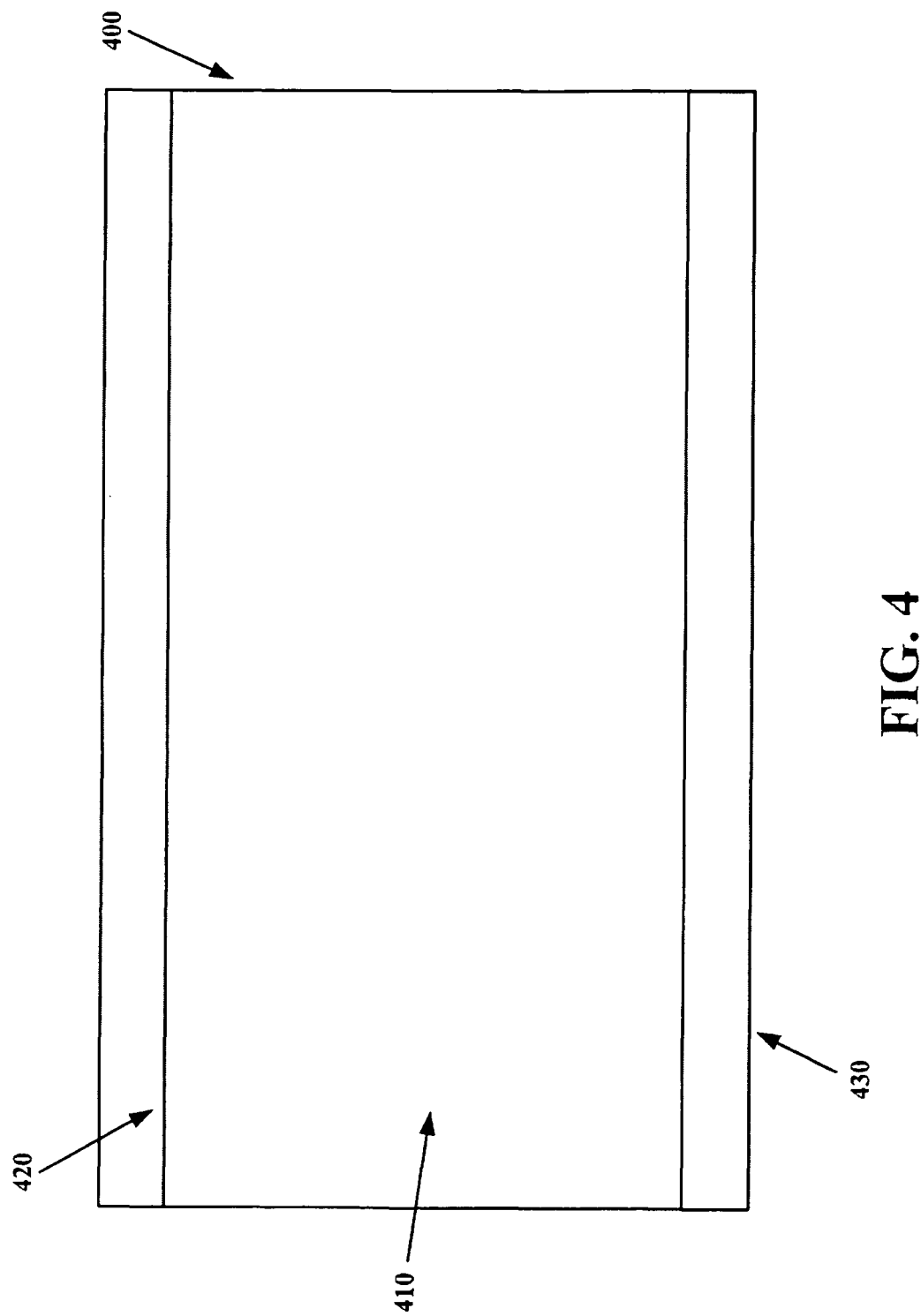
FIG. 4 illustrates an embodiment of an extensible media player application.

FIG. 4 illustrates an embodiment of an extensible media player. In this embodiment, a media player application 400, either instantiated or executed, may have loaded a selected media file and associated modules. One of the associated modules may be a pre-roll curtain module. The pre-roll curtain module may display an advertisement or other content prior to the playing of the selected media file. In this embodiment, an advertisement may be displayed in the video viewing screen 410. The pre-roll curtain module may include one or more banners 420, 430 which specify identifying information, such as the source of the advertisement displayed and the provider of the media file to be played. The duration of the pre-roll curtain module may be defined by the presentation data file. This duration is dynamic and may differ depending on, among other things, the media file presented or requirements specified by the advertiser. It is to be appreciated that all modules like the pre-roll module have the capability to retrieve their own configuration and policies outside of the presentation data file, like from a separate Ad systems network or multiple networks depending on the media file or advertising requirement.

Figure 5:
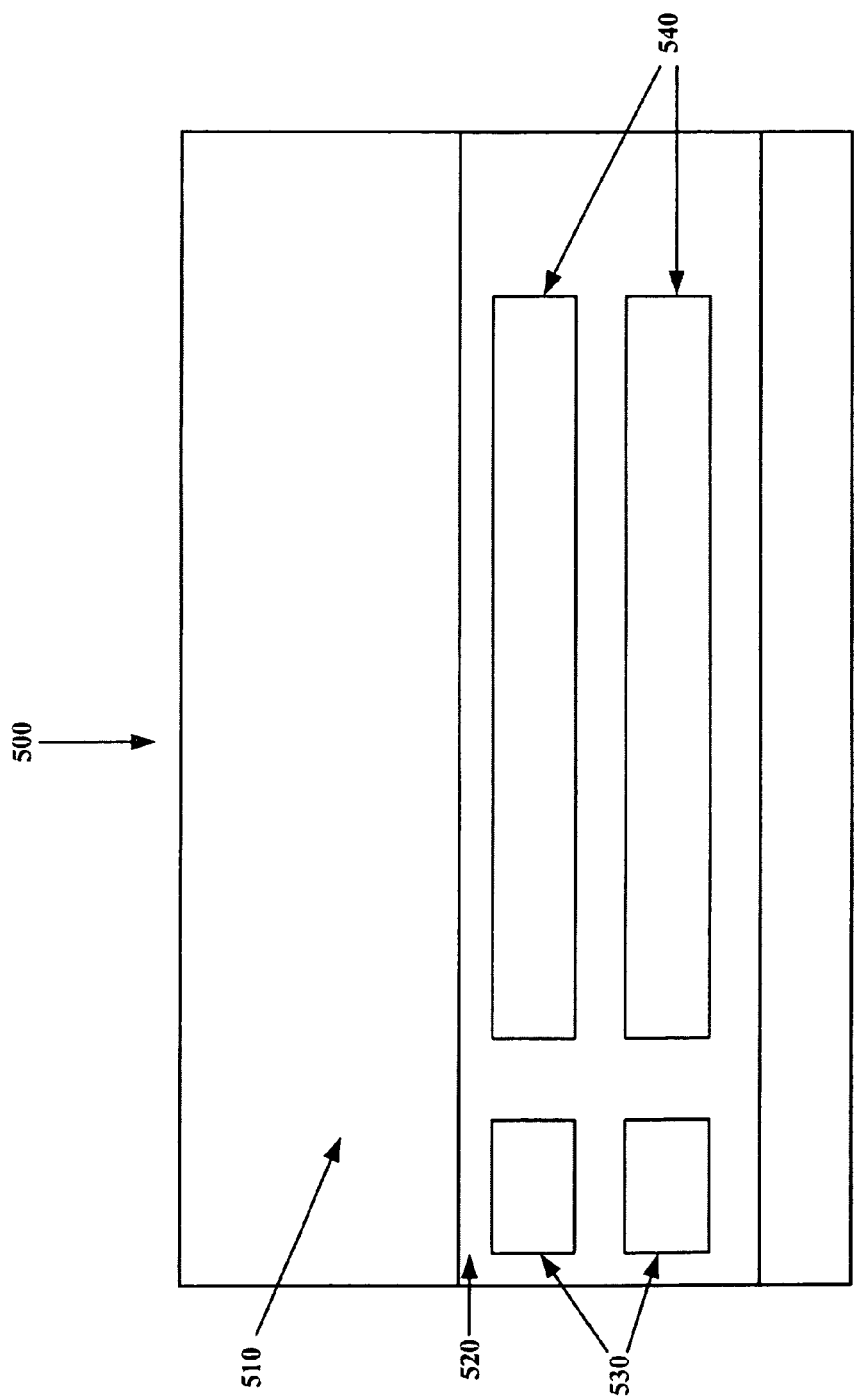
FIG. 5 illustrates an embodiment of an extensible media player application.

FIG. 5 illustrates an embodiment of an extensible media player. In this embodiment, a media player application 500, either instantiated or executed, and housed in a client device may load and play a selected media file in a video viewing screen 510. Accompanying the loading and playing of the selected media file may be selected modules, downloaded from a server and defined by a presentation data file transmitted from the server to the client device. One of the modules may be a clip list module 520 listing additional media files available for playback. The clip list module 520 may either transparently overlay or fully obscure part or all of the video viewing screen 510. The clip list module 520 may be interactive with the user, enabling the user to select a displayed clip for playback. In one embodiment, the clip list module may be displayed subsequent to the playing of a selected media file. Generally, the timing of execution of the clip list module 520 and other modules is defined in the presentation data file which is parsed and passed to the media player application 500. In another embodiment the lifetime of the clip list module may be defined by a Ad module or some other module not including the media clip metadata itself that defines restrictions for the module and content being displayed. The clip list module may include one or more thumbnail preview images 530 and accompanying captions 540 describing the subject matter of the media files.

Figure 6:
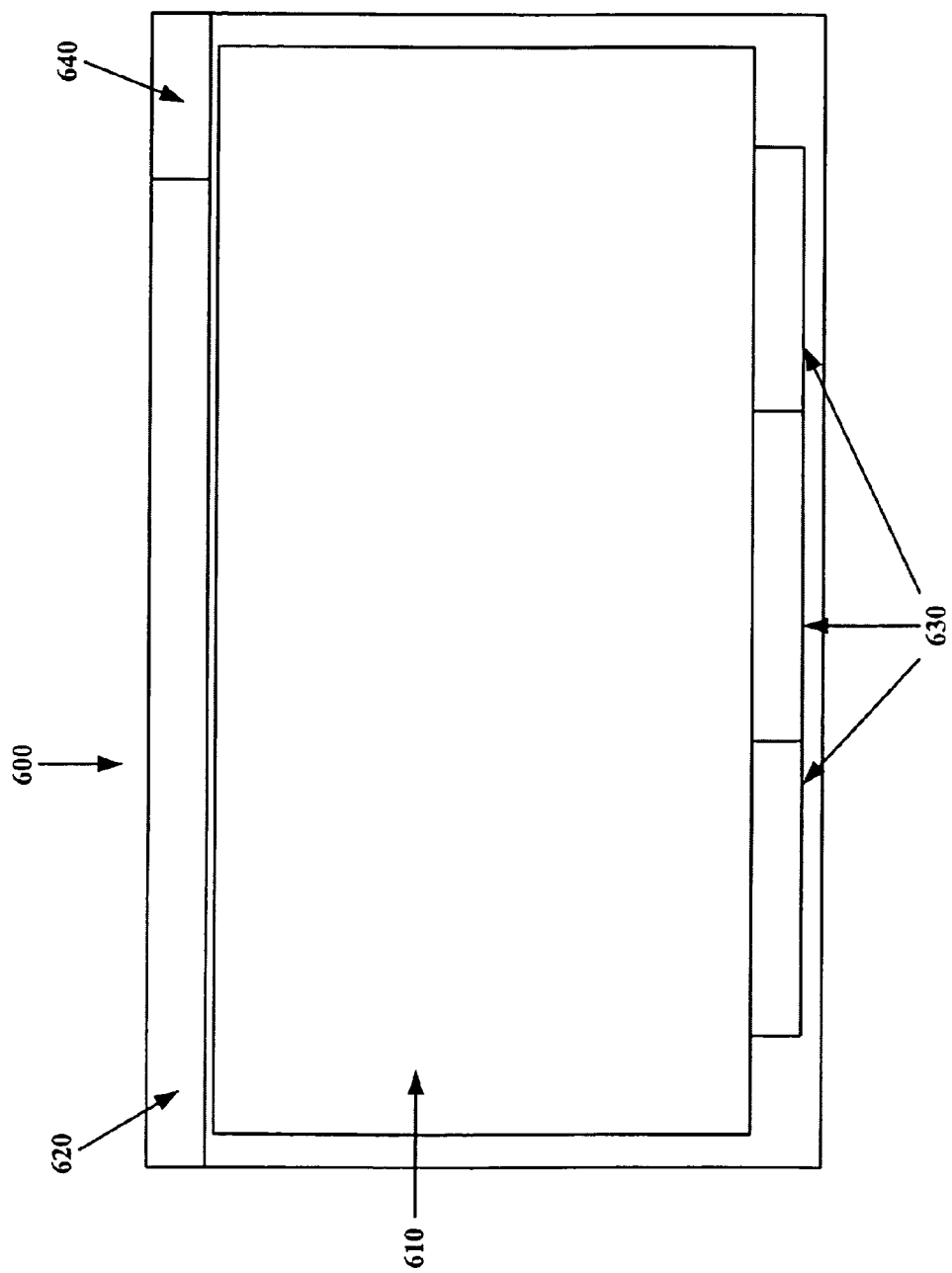
FIG. 6 illustrates an embodiment of an extensible media player application.

FIG. 6 illustrates an embodiment of an extensible media player. The extensible media player application may be configured to display rich media advertisements, which display an advertisement to a user and enable the user to interact with the advertisement. A rich media advertisement may be displayed any time prior to, concurrent with, or subsequent to the playing of a selected media file. The advertisement may be displayed when a video is paused or otherwise halted. The timing of the rich media advertisement may be defined by the presentation data file passed from the server to the client. In this embodiment, the rich media advertisement may include an advertisement displayed in a video viewing screen 610, accompanied by a banner 620 identifying the source of the advertisement, interactive banners 630 enabling a user to obtain additional information about the advertisement, and an exit button 640 enabling a user to close or exit from the advertisement. The duration and placement of these presentation aspects is not fixed and may be specified in the data presentation file. The interactive banners 630 may be configured to communicate with remote sources for retrieval of additional information related to the advertisement. In response to the selection of one of the interactive banners 630, the banners 630 may open additional browser windows and/or direct the user to a related content.

Figure 7:
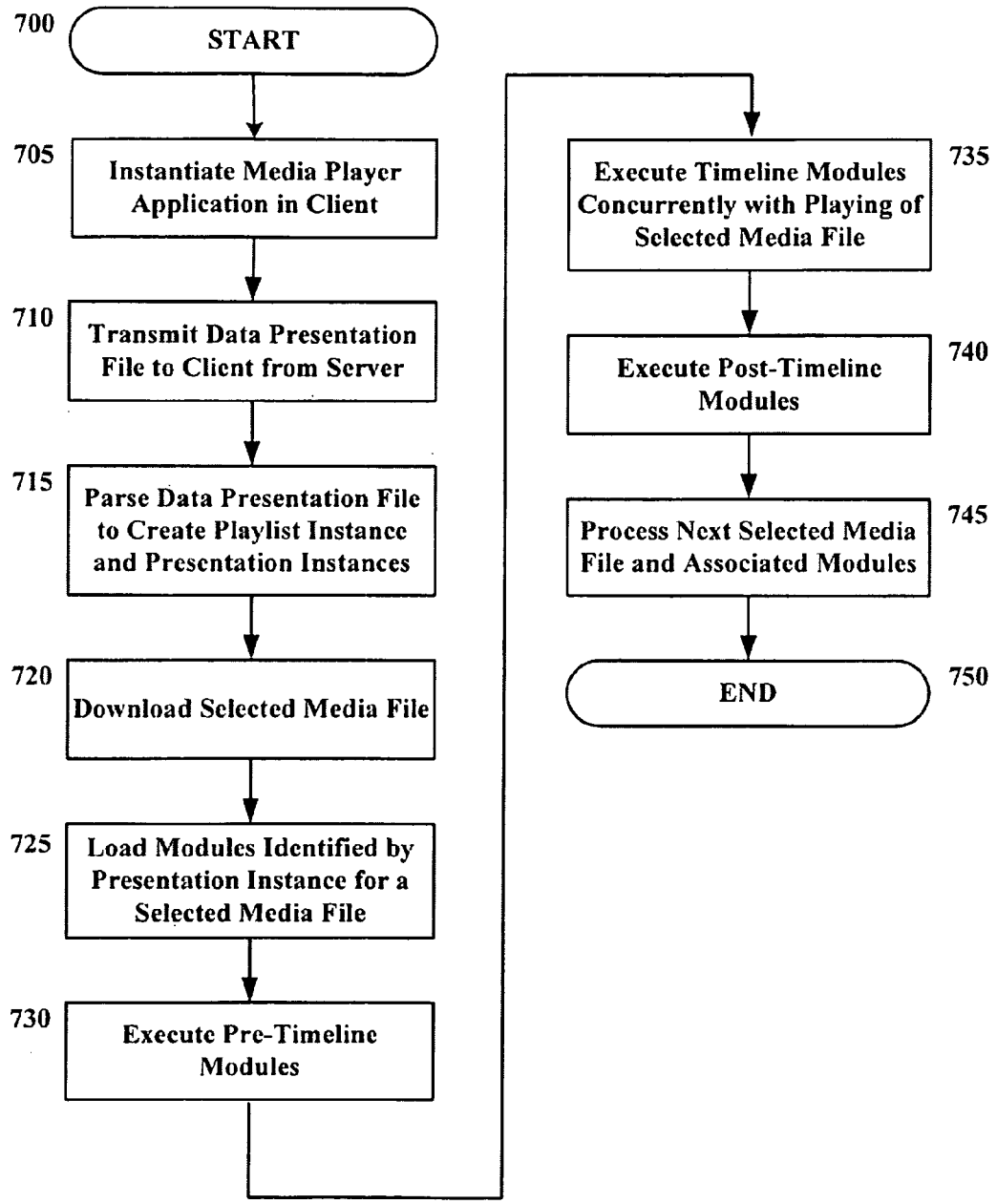
FIG. 7 is a flowchart illustrating one embodiment of a method for providing an extensible media player.

FIG. 7 is a flowchart illustrating one embodiment of a method for providing an extensible media player. In block 705, a media player application may be instantiated in a client device. In one embodiment, the media player application may be a Flash application embedded in a web page in an Internet browser. Alternatively, the media player application may be created as a Microsoft Silverlight™ application. In block 710, a presentation data file may be transmitted to the client device from the server. The presentation data file may be passed to the media player application from within a web page as a parameter or programmatically via JavaScript if the media player application is embedded in the web page. Alternatively, the media player application instantiated or residing in the client device may be given the source address of the presentation data file in order to fetch the presentation data file from a remote source in a network. The presentation data file may define a set of media files available for playback. Additionally, the presentation data file may specify one or more modules associated with each of the defined media files. These modules may affect an aspect of the presentation of a media file to a user or may extend the functionality of the media player application. The modules may control the presentation, playback, and other aspects of the media player through interaction with an API of the media player application. The presentation data file may specify presentation parameters for the modules affecting presentation aspects of the media file, such as, for example, the height, width, aspect ratio, transparency, and duration of the modules for a particular media file.

In block 715, the presentation data file may be parsed, and an instance of a playlist document may be passed to the media player application. The playlist instance may include a playlist items corresponding to media files available for playback. Each playlist item listed in the playlist may include an address or location from which a corresponding media file may be retrieved. A presentation instance may be created for playlist item listed in the playlist instance. The presentation instance may specify which modules and module-specific parameters are to be used by the media player application for a specific media file. In block 720, in response to a user selection of a playlist item, the media player application may request that a server transmit the requested media file corresponding to the playlist item to the client device. The server may transfer or stream the requested media file. In block 725, the media player application may load the downloaded or streamed media file and specified modules associated with the selected media file. The modules may be downloaded from URLs specified in the presentation data file. Version checking for each module may be performed using the module URL.

In block 730, pre-timeline modules, defined to be executed and/or displayed prior to the playing of the selected media file, may be executed. Examples of pre-timeline modules may include but are not limited to a pre-roll curtain displaying an advertisement, and a container module to house third party content which may conflict or be non-conforming with the media player application. In block 735, the media player application may load and play the selected media file. The media player application also may execute and/or display modules chosen to concurrently run with the playing of the media file. Such modules may include but are not limited to a banner module to display an advertisement during playing of the media file, a player controls module to display a set of user controls for controlling the playing of the media file, a closed captioning module to display closed captioning, and a clip list module to offer additional available media files for playback. In block 740, subsequent to the playing of the media file, the media player application may execute and/or display post-timeline modules. Post-timeline modules may include but are not limited to the clip list module and a post-roll curtain module to display an advertisement subsequent to the playing of the media file. In block 745, the media player application may process the next playlist item selected by a user. Processing may include downloading or streaming the media file, downloading associated modules, and loading the media file for the next playlist item and associated modules.

Figure 8:
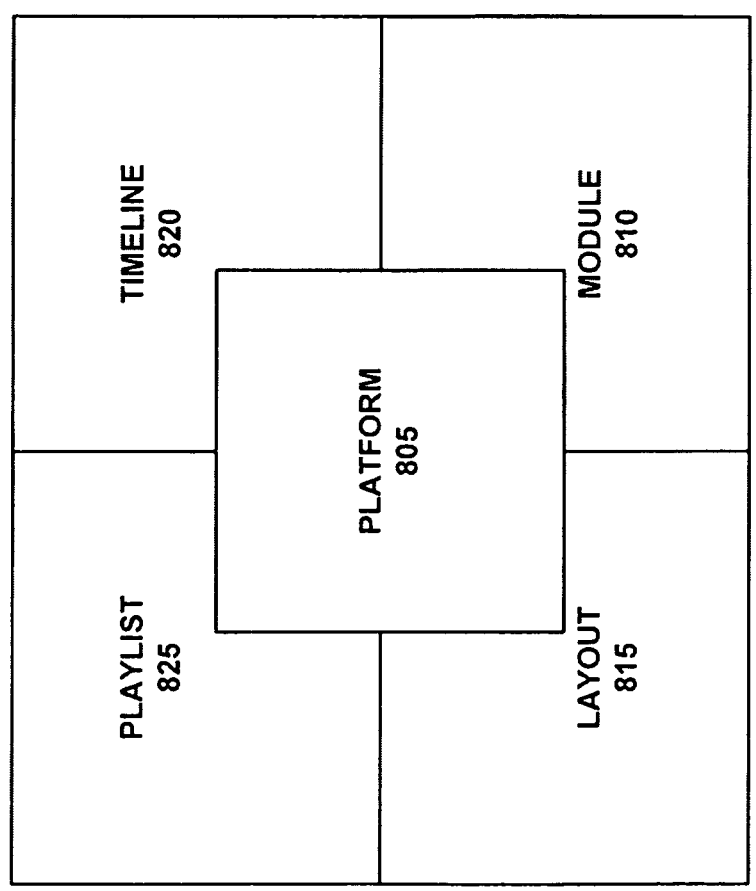
FIG. 8 illustrates an embodiment of a software platform supporting an extensible media player.

FIG. 8 illustrates an embodiment of a software platform supporting an extensible media player. While various applications and code supporting the software platform 805 may reside in and otherwise be supported by the system of FIG. 1, various system architectures and configurations may be employed. The platform 805 generally supports the embodiments disclosed herein. The platform 805 may support the use of various independent and decoupled modules 810 and layouts 815 to deliver an extensible media player. These modules 810 and layouts 815 may be programmatically delivered to the media player or via a data file. A sample high-level outline of a data file is shown below:

```
<?xml version="1.0" encoding="UTF-8"?>
<MTL xmlns="http://video.yahoo.com/YEP/1.0/">
  <Playlist>
    <Layouts/>
    <Modules/>
    <TimelineTemplates/>
    <Timelines/>
  </Playlist>
  <Data/>
</MTL>
```

The data file may describe and configure a media player application. The data file is structured in a hierarchical format, such that the data file may describe a playlist of timelines and associated media files or applications, and within the playlist, one or more layouts, modules, timelines, and timeline templates that are associated with one or more media files in the playlist. The modules 810, layouts 815, timelines 820, and playlists 825 may interface with the extensible media player platform via one or more APIs. In this respect, the platform offers to media player and module developers a standard base upon which to consistently process and interact with code or programs written for the extensible media player.

Each module 810 operates to extend a functionality or presentation aspect of the media player or to enhance the media player experience, such as through user interactivity. Each module may be decoupled from other modules such that each module operates independently of other modules. Because each module operates independently of other modules, a developer may create his or her own modules that may be injected or loaded into the platform to operate with the media player. However, even though modules are decoupled from each other, the modules may communicate and transfer data between and among themselves. A sample portion of a presentation data file with respect to modules is shown below:

```
<Modules>
  <Module id="jsapi" source="http://yepstuff.com/JavascriptAPI.swf"
    layoutTargetId="_none">
    <Parameters>
      <Parameter
```
id="event_function">y_up_eventHandler
```
    </Parameters>
  </Module>
  <Module id="video" source="http://yepstuff.com/VideoPlayback.swf"
    layoutTargetId="video" isTimeSource="true"/>
</Modules>
```

The modules associated with a particular media file also may be selected programmatically via the platform. Modules may run on an application level, a playlist level, or a timeline level. If a module is running on an application level, the module may always be active, and does not need to be defined for each timeline (corresponding to a media file or application) or playlist (corresponding to multiple media files or applications). If a module is running on a playlist level, the module will be active for each timeline located in the playlist. If a module is running on a timeline level, the module is running only when it is activated during the course of a specific timeline and associated media file or application.

A container-based layout approach may be used to organize the location of modules and media files within the media player application. Using this approach, one or more modules 810 may be placed within a layout container by the platform, with multiple containers capable of being used together to control the display of various modules when the media player is executed. Modules may be placed within a particular layout container by specifying a layout ID corresponding to the layout container in which the module is to be inserted. Use of containers to define the location of modules may eliminate the need to place modules directly on the display, and consequently logic or code previously used to define the size and placement of the modules on the display is unnecessary.

One supported module is a playback controls module that governs the execution or play back of media files in the player application. The playback controls module may include functionality for displaying the duration of a media file and controlling the playback of a media file, such as media player controls for playing, pausing, or stopping a media file, adjusting the volume of a media file and so forth. The playback controls module may provide additional functionality for interacting with a user if an application, such as a game, is presented to the user in place of a media file. For an application, the playback controls module may specify a duration in relation to some aspect of the application. For instance, if the application is a game, a game module may give a user 10 seconds to respond to a question. The playback controls module may display this 10 second duration to the user. A playlist 825 may store or maintaining a list of timelines to be played. As described in more detail below, each timeline may specify a set of modules and timing information, such as activation points (e.g., start and stop points), for each of the modules associated with the timeline. The modules associated with the timeline may playback one or more files of a media type (e.g., a multimedia file, an audio file) or may run one or more applications, such as a game. These media files and applications may be played back or executed at the same time if desired. The media file(s) or application(s) to be rendered may be determined by the modules associated with the timeline. The playlist 825 may maintain templates or common elements for one or more timelines. If a presentation data file is used to specify timelines to be loaded and modules and layouts to accompany the timeline to render media files or applications, the presentation data file may reference or call templates to be loaded for the timelines. The templates or common elements may define which modules 810 are to be used during the playback of the timeline and media files, with the advantage being that modules 810 commonly used by one or more timelines may be retrieved once and reused, thereby eliminating a need to call and retrieve the modules from the servers for each timeline. If templates are not used, the playlist 825 may store a list of timelines to be played, along with associated modules 810 and layouts 815 to be retrieved and used to render the presentation and playback of each media file.

In one embodiment, instead of using pre-roll, concurrent, and post-roll modules (relative to the playback of a media file) to control the timing of activation or execution of modules for a particular media file, a module 810 may serve as a timesource, or a timing reference to synchronize the activation or execution of other modules relative to the playback of the timeline and the media file. The timeline 820 may start playing and modules may activate and playback a media file or execute an application. As contemplated herein, a timeline may be a combination of modules, UI and data that is used to display one or more clips of media or one or more applications. The module(s) may execute or otherwise remain active for the duration of the timeline. Because the module 810 serves as a timing reference, other modules may be activated or called using the timing parameters maintained by the module 810. The timing references provided by the module 810 may be expressed in, for example, seconds elapsed or remaining, frames elapsed or remaining, percentage of media file played back or completed, percentage of the media file remaining, or any other way by which a media file or application may be measured. Sample code from a sample presentation data file with respect to the timeline is shown below:

```
<Timelines>
    <Timeline id="timeline1" templateId="defaultTimeline"/>
    <Timeline id="timeline2" templateId="defaultTimeline">
        <!-- Layouts specific to timeline2 -->
        <!-- Metadata specific to/overridden by timeline2 -->
        <!-- Parameters specific to/overridden by timeline2 -->
        <!-- Modules specific to timeline2 -->
    </Timeline>
</Timelines>
```

The platform 805 and the modules 810 may support the use of blocking modules that prevent or halt the execution or playback of the timeline until some predetermined event occurs. Any other module 810 may act as a blocking module through the assertion of a blocking flag or other indicator that identifies to the time source module 810 and the platform 805 that the execution of the timeline is to be stopped until the blocking module gives permission for execution or playback to be resumed. Permission may be given by activating or otherwise interacting with the functionality of the blocking module causing execution of the timeline to be blocked.

Figure 9C:
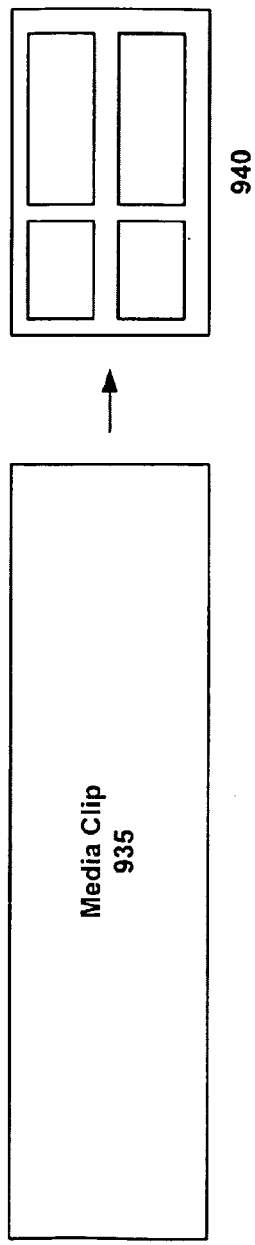
FIG. 9C illustrates an embodiment involving the use of a blocking module.

FIGS. 9A through 9D illustrate exemplary embodiments involving the use of a blocking module. In FIG. 9A, an embodiment of a commonly occurring blocking scenario is illustrated. When a timeline and one or more modules are first loaded into the media player application for playback, media files or applications dynamically or programmatically associated with the timeline and modules (via the presentation data file, for instance) may be retrieved from the central server and/or loaded. A timeline (and the playback of modules and associated media files or applications) may be blocked by a start screen module 905. The start screen module 905 may indicate that playback of the timeline is to be blocked by asserting a blocking flag in the module. The blocking flag will alert the platform that playback of the timeline and associated media file is not to occur until the start screen module gives permission. In this embodiment, the start screen module 905 may require that a user select or trigger a play button or icon 910 located in a separate playback controls module in order to start playback of the timeline and media file. Prior to the play button 910 being selected, the platform will not permit the video to start playing on its own. When a user selects the play button, a signal or other indication may be sent to the media player platform that the play button was selected. The platform may respond to the start screen module 905 to ask if playback of the media file and execution of the timeline may start or otherwise continue. The start screen module 905 may indicate that play may continue (or start). The start screen module 905 may de-assert its blocking flag thereafter to allow the media file 915 to be played.

FIG. 9B illustrates an embodiment involving the use of a blocking module. In this embodiment, a media file 920 may be playing in the media player application. When the timeline, and in this case the media file, reach a certain predetermined timing reference point 925, such as for example, 50% completion of the media file, an advertisement module 930 may activate and block continued playback of the media file until after the advertisement retrieved or called by the advertisement module 930 is completed. In other embodiments, the predetermined timing reference point may be based on the timeline alone, the duration of a particular module, or the media file or application associated with the timeline, For example, if a timeline is associated with multiple media files, a timing reference point may be set for 25% of the timeline irrespective of the duration or playback status of the associated media files. The presentation data file may reference the advertisement module 930 with a timeline or a playlist, such that the advertisement module 930 is retrieved with other modules when the timeline is loaded into the media player application. Activation of the advertisement module may pause the media file. The platform may ask or query the advertisement module 930 as to when playback of the timeline and media file may resume. When the ad finishes execution or displaying, the advertisement module 930 may deassert its blocking flag and respond to the platform that playback may resume.

FIG. 9C illustrates an embodiment involving the use of a blocking module. In this embodiment, a timeline and associated module, layouts and a media file 935 may be loaded into a media player application. The timeline and media file 935 may play for their duration, at which point a selection module or module that lists additional media files may activate and display additional media files that may be selected and played. The selection module 940 may block the media player application from executing until one of the media file options listed on the selection module 940 or the media file list is chosen.

Figure 9D:
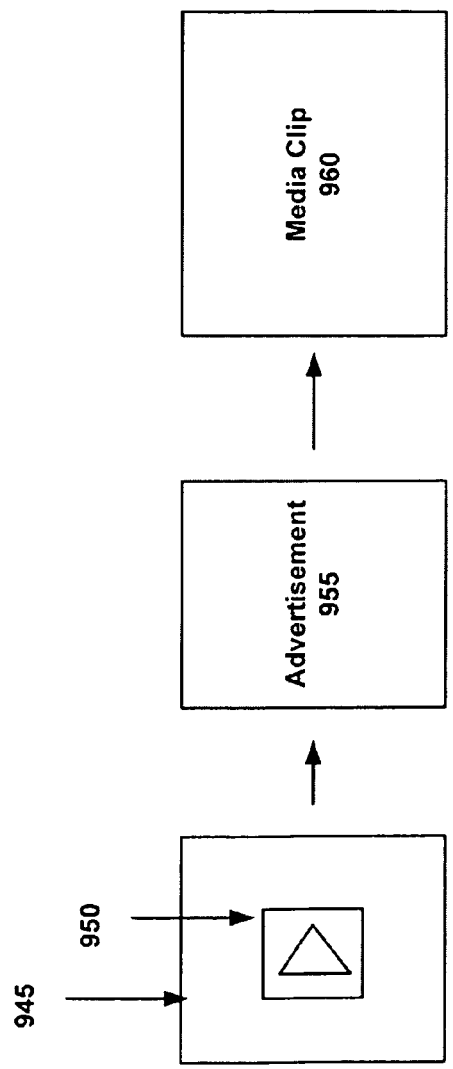
FIG. 9D illustrates an embodiment involving the use of a blocking module.

FIG. 9D illustrates an embodiment in which successive blocking modules may activate. A timeline and its associated modules and a media file 955 may be loaded at time t=0 relative to the duration of the media file. The time may be maintained by the media file itself or by a timesource module. A start screen module 945 may assert its blocking flag to the platform to prevent the media file from executing until a play or start button is selected. The platform may ask the start screen module 945 whether execution may continue. Once a play button 950 has been pressed or selected, the start screen module 945 may respond to the platform that execution of the timeline and media file can continue. The start screen module 945 also may deactivate its blocking flag. A presentation data file that specifies which modules, and their associated media files, are to be loaded for a media file and the order of execution of the module may next specify that an advertisement module 955 is to activate and block playback of the timeline and media file at time t=1. Alternatively, the modules to be loaded and activated may be specified programmatically without recourse to a presentation data file. At time t=1, the advertisement module 955 may activate and block playback of the timeline and media file until the ad is finished displaying. The advertisement module 955 may de-assert its blocking flag and indicate to the platform that playback of the timeline and media file may continue. The media file 960 may then play, and the platform may verify whether additional blocking modules are to be activated during the playback of the media file.

The media files or applications associated with the modules may further include code that handles scenarios involving seeking of a media file. For instance, if a timeline and associated media file are being played, and a user chooses to fast forward or seek ahead to a different part of the media file, the timeline and media file may run into or cross paths with a blocking module that is set to activate prior to the seek ahead location. In this case, the blocking module may or may not permit seeking, such that if the blocking module does not permit seeking ahead, the blocking module will activate and halt the seek at the moment when the blocking module is set to activate. The user is then required to experience or interact with the presentation of the blocking module's content before being permitted to seek ahead. While the blocking module blocks the media file from seeking ahead, the blocking module or the platform may track and remember the desired seek ahead location, such that when the blocking module de-asserts its blocking flag, the timeline and media file are transported ahead to the desired seek ahead location. Similar functionality may be effected for scenarios where a user desires to seek backwards in a timeline and associated media file. For those situations where a user has already viewed or otherwise executed a blocking module, the blocking module may include code that may prevent a blocking module from re-activating or triggering if a user seeks backwards and crosses paths with the blocking module again. Alternatively, there may be instances in which a blocking module will always activate regardless of whether a seek forward or backward triggers the blocking module.

Modules may include certain user interface elements that may be applied to the media player application. For instance, a module may include common graphical user interface elements, such as a button, a check box, a drop-down menu, or a text box. These examples are merely illustrative and are not intended to be limiting with respect to the types of graphical user interface ("UI") elements capable of being supported by a module. Even if modules originate from different developers or sources, the modules should still offer a seamless look and feel to a user. For example, if first and second modules each have a button, the buttons from both modules should often have the same presentation to a user. The extensible media player may support the use of themes and stylesheets to provide a seamless look and feel for UI elements contained in the various supported modules. Themes may be sets of stylesheets. The themes and stylesheets may be stored at a server or central repository or may be passed to the platform programmatically. In one embodiment, the stylesheets may be similar to those of the Cascading Style Sheet ("CSS") standard. The stylesheets may define or describe the presentation of various UI elements. In one embodiment, a stylesheet may describe the element to which the stylesheet applies and assign colors, states, margins and borders, text alignment, and fonts for the given element.

Unlike CSS, where a web browser or other application program applies a stylesheet to a document, web page, or set of graphical UI elements to control its presentation, the platform may not apply the theme or stylesheet to the modules. Since the platform primarily exists to provide a standard base from which various modules and components can interact with a media player, the platform may not know whether a module contains any UI elements. Instead, the modules may themselves retrieve or obtain themes and stylesheets to be applied to the UI elements contained within the modules. The modules may know that certain code and logic contained therein are directed to one or more UI elements. Because the module knows it has one or more UI elements, when instructed, the module may seek to retrieve or obtain the latest active theme to apply. The modules may be instructed to retrieve new themes or stylesheets to render their respective UI elements via the data file or programmatically. The modules may use a set of functions supported by the platform and the themes to, among other things, retrieve theme or stylesheet values for their respective UI elements. For instance, if a module has a button, the module may ask the platform to return values for the button. As part of the request for values, the module may specify its module ID if it has one, a type of element it wishes to obtain values for, an element ID for the element if one exists, or in the alternative, a class of stylesheet, a state to be assigned the UI element, and a fallback theme to be applied if no specific value for any element attribute is given. In order to maintain a uniform look and feel, a default theme may be applied to a UI element first, followed by the cascading of any specified or retrieved values for specific attributes. This way, the UI element will always have a default presentation. If the module fails to specify one or more attributes when requesting theme data values, default values may be returned to the module. Use of the default values may enable the UI element for a particular module to always have a uniform look and feel relative to the same or similar UI elements maintained by other modules.

In one embodiment, the cascading of themes and stylesheets may occur first at an application level using a default theme. As a playlist is loaded, a theme may be applied to the entire playlist or certain aspects of the playlist. The playlist theme may override the default application level theme for those attributes specified by the playlist theme. A specific timeline and its associated media file may have its own theme. Application of this timeline theme may override those attributes of UI elements for the particular timeline and associated media file, while UI elements associated with other timelines and media files, the playlist, and the media player application may remain unaffected. By cascading stylesheets and themes from an application level to a timeline level, various stylesheets and themes may be merged into one active stylesheet for the player.

FIGS. 10A through 10C illustrate embodiments of layout containers. The layout of a media player application defines the visual structure of the display using containers. A layout container is a layout object that can contain other containers or modules. Layout containers are used to organize modules on the display. Multiple layout containers may be used together to display modules. Each layout container may have an associated layout container ID. Modules can be placed in a certain layout container by specifying a container ID. This specification can exist in a presentation data file or can be made programmatically. Default layouts can be defined on the application or playlist level for all timelines and modules, but individual timelines with different layouts can override a default layout. Similar to previously described with respect to modules, layouts may operate on an application level, a playlist level, or a timeline level. If a layout operates on an application level, the layout may always be active, and does not need to be defined for each timeline (corresponding to one or more media files or applications) or playlist (corresponding to multiple timelines and associated media files or applications). If a layout operates on a playlist level, the layout will be active for each timeline located in the playlist. If a layout operates on a timeline level, the layout operates only when it is activated during the course of a specific timeline and associated media file or application.

Three layout containers may be used to define the visual structure of the display. A Hbox layout container may stack items and modules 1005, 1010, 1015 next to each other horizontally (e.g., in the x-axis). The items and modules in two Hbox containers located adjacently may overlap. A Vbox layout container may stack items 1020, 1025, 1030 on top of each other vertically (e.g., in the y-axis). Vbox layout containers may overlap. A Canvas layout container may permit modules or items 1035, 1040, 1045 to overlap each other in a z-axis. Canvas containers may permit layering of modules and other items, or the superimposing of one module over another on the display. In FIG. 10C, a video display 1035 and playback controls 1040 may reside in a first layer with an advertisement 1045 overlaying the display and playback controls. The dimensions of each layout contained may be specified, including height, width, a z-axis index, percent height, percent width, padding or borders, a stretch factor, and a background color. Sample code from a sample presentation data file with respect to layouts is shown below:

```
<Layouts>
    <Layout id="default">
        <!-- Layout containers -->
    </Layout>
    <Layout id="fullscreen"/>
</Layouts>
```

Layout containers may be used in conjunction with a timeline and associated modules to switch between different layouts and modules during the playback of a timeline and associated media file. For instance, a media player display screen may occupy the majority of a screen with a playback controls module placed in a layout container for display with the display screen. The act of a play button being selected may trigger a transition from one layout to another, with the platform laying out the new layout. Generally, any event may trigger a new layout to be displayed, along with new modules being activated. Additional exemplary embodiments that may trigger new layouts may include the resizing of a video window and clicking an info button that triggers a layout change and activation of an information module.

Figure 11:
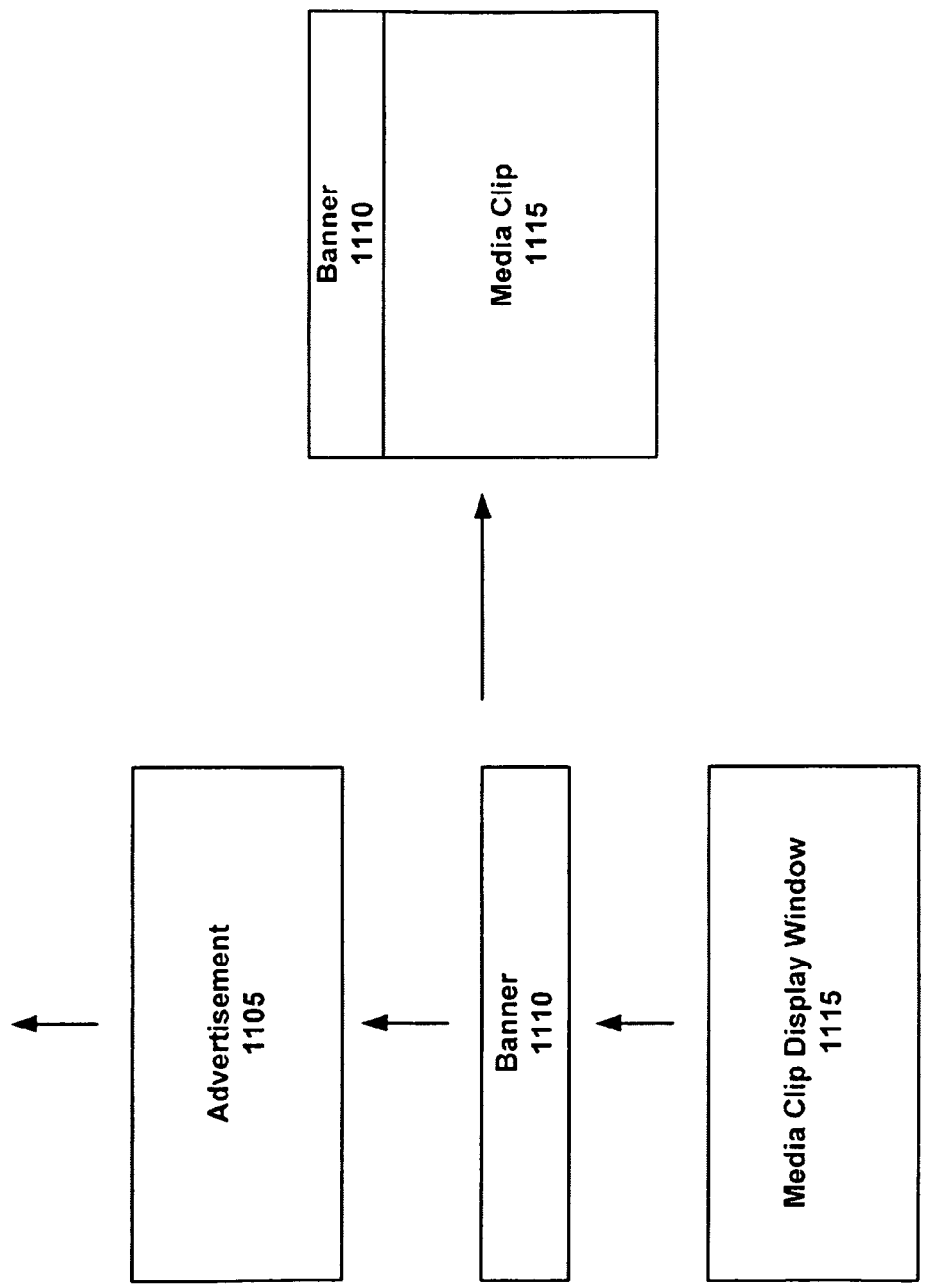
FIG. 11 illustrates an embodiment of a custom panel.

The extensible media player platform may support custom panels. A custom panel may be appropriate where a custom multimedia presentation or additional presentation aspects or features beyond playback of a media file are desired. A custom panel can have a standard layout, such as a video display portion and a set of playback controls. However, a custom panel may enable transitions and animations between layouts. For instance, FIG. 11 illustrates a series of transitions between layouts for a custom panel. An advertisement 1105 contained in a layout container may be displayed prior to the playing of a media file. As the advertisement 1105 finishes playing, the advertisement 1105 may visually slide up the display and out of view. As the advertisement 1105 slides upward, a media file display screen 1115 with a banner advertisement 1110 may slide up to replace the ad 1105 on the display. The media file display screen 1115 and the banner advertisement 1110 may be two separate layout containers. The three layout containers in this embodiment may be placed into the custom panel. Custom logic may be used in the custom panel to animate the transitions between layouts and presentations.

Figure 12:
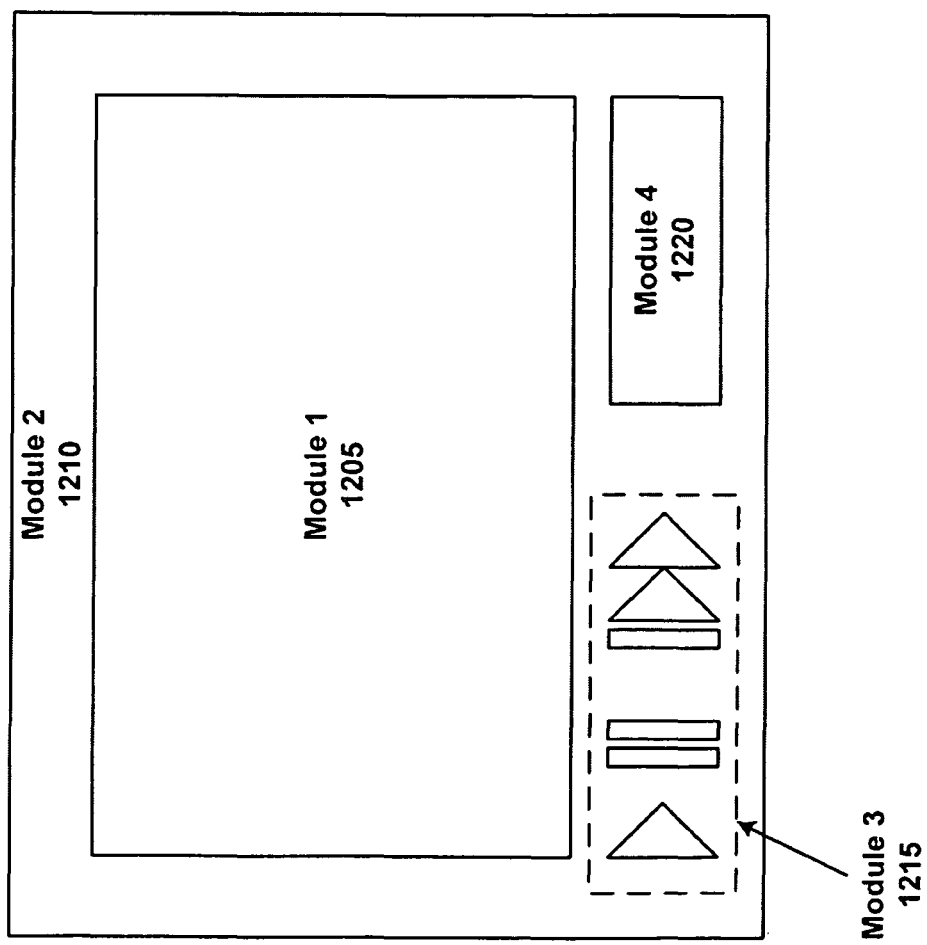
FIG. 12 illustrates an embodiment of an extensible media player.

FIG. 12 illustrates an embodiment of an extensible media player. The player may include a first module, designated Module 1 1205, which may be a module for the display screen of the media player application. A second module, designated Module 2 1210, may be a module for a skin for the player application window. A third module, Module 3 1215, may be a set of player controls for controlling the playback of a media file. A fourth module, Module 4 1220, may be a button or other UI element capable of performing some function. Each module as shown in FIG. 12 may be the UI element of the module, with the code or logic of the module executing in the background or when the UI element of the module is selected. Each module may have an associated theme. For instance, a first theme, Theme 1, may specify that the playback controls of Module 3 1215 should be black, any text should be blue, and any background should be green. A second, Theme 2, may specify that the UI element of Module 4 1220 should be blue, the text should be green, and the background color should be red. In certain embodiments, if a player is sponsored by an advertiser, the skin of Module 2 1210 may reflect a theme containing the advertiser's logo. In each case, the theme applied to the UI elements of the modules is requested and retrieved by the modules from the platform. The request or retrieval of the theme may be prompted by a programmatic command to change themes or by the data file that configures the player. Thus, for example, if one media file ends and a new media file is loaded, the data file may instruct the platform that a themeing change is needed. The theme change may be effected by replacing or adding the theme ID of the new theme to be rendered. The theme ID may be inserted in the data file, or may be passed to the platform programmatically. The platform may instruct the modules that a theme change is needed. In response, the modules may retrieve a new theme to accompany the new media file. The new themes may be rendered to give the player a new presentation for the new media file. In this respect, through the programmatic instructions or the data file, theme or stylesheet changes may be propagated to one or more decoupled modules running in their own independent environments. In contrast to conventional CSS, the platform may not contain a Document Object Model (DOM) that describes all of the elements needed to render a style or theme.

The data file used to propagate theme and style changes to the platform and the modules may be dynamic as well. During the lifetime of the player, the player can render or be given new themes and styles without having to refresh or reload the player or download a new player. Moreover, dynamic themeing and styling of a player may enable a player to adopt an advertisement theme during the playing of an advertisement. UI elements may be instructed during advertisements to disappear or become hidden.

The themeing and styling capabilities of the platform may further include the capability of the platform to automatically download assets or files, such as image assets or animation assets, used in various themes or styles. This automatic download capability may include the ability for the platform to retrieve these assets from a URL specified as the background. If a module loads and requests a large asset or file that has not been retrieved or is currently being retrieved by the platform, the platform may generate an event notification to the module when the asset has finished downloading.

Figure 13:
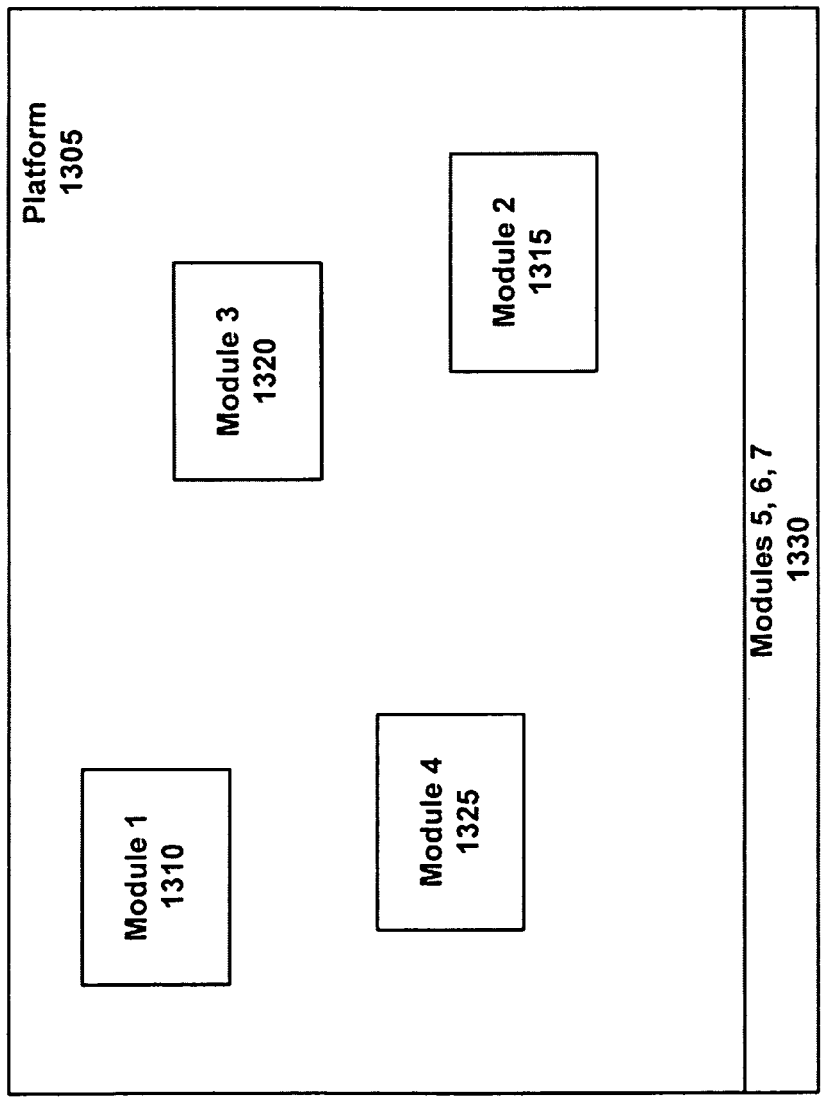
FIG. 13 illustrates an embodiment of an extensible media player.

FIG. 13 illustrates an embodiment of an extensible media player platform. Multiple modules may be supported and executed by the platform 1305. As previously stated, a module may be application code and logic that extends the functionality of the media player application. While sources internal to the extensible media player development may supply the modules, third party developers likewise may design and provide their own modules for use with the media player. A data file may use these modules to describe and configure the player. For instance, the data file may indicate that Module 1 1310, Module 2 1315, and Module 3 1320 are to be used in conjunction with the media player, with a playlist of timelines that may each play a media file or run an application, or with a single timeline and associated media file or application. Alternatively, a third party developer could write a module that removes Modules 1 through 4 from the platform and replaces them with the developer's own set of modules.

An embodiment may exist in which a media player supplier may not want certain modules 1330 to be removed from the platform. In this case, these modules 1330 may be designated as secure or unloadable. An example of such a module may be a metrics module that reports and tracks advertisements, user interactions, and other metrics. By designating certain modules 1330 as unloadable or secure, these modules 1330 may not be removed during the lifetime of the player instantiation. Designation of such modules 1330 may occur via the data file. A sample of this data file is shown below:

```
<?xml version="1.0" encoding="UTF-8"?>
<MTL xmlns="http://video.yahoo.com/YEP/1.0/">
  <Modules>
  <Playlist>
    <Layouts/>
    <Modules/>
    <TimelineTemplates/>
    <Timelines/>
  </Playlist>
  <Data/>
</MTL>
```

As previously mentioned, the data file may hierarchically list a playlist, layouts, modules, and timelines that are associated with the player itself or certain media file(s). In one embodiment of the data file, modules may be specified on a playlist level such that the modules may apply to specified media files listed in the playlist. In this data file, a new hierarchy level may be added to accommodate designated secure or unloadable modules. This new hierarchy level may reside at a root, top, or application level. Modules designated on this module level may be unloadable or secure for the lifetime of the player.

FIG. 14A illustrates an embodiment for module communication. Modules generally may operate independently such that no dependencies exist between the modules. This independency may enable modules developed by any developer to be supported by the extensible media player platform. However, in certain instances, modules may need to communicate and exchange data with each other. In one embodiment, the media player may be implemented using the Flash framework. However, the media player may be implemented using other known frameworks that support multimedia and rich Internet applications, such as Microsoft Silverlight. The framework by which the media player is implemented is not intended to be limiting. Modules operating in an exemplary Flash framework may use the Flash eventing mechanism to communicate via the standard Flash event dispatcher functions. When modules use the Flash event dispatcher however, developers of the modules and the player platform may not be able to track communications or events transpiring between the modules. Further, Flash communication events require the destination references for communications originating from a particular module. Given a platform objective of decoupled and independent modules, use of the Flash framework and a Flash event dispatcher may require a stronger coupling between modules than desired by the platform. Such communications or events are depicted in FIG. 14A. A first module 1405 may communicate with a second module 1410 through a Flash framework, depicted as element 1415.

FIG. 14B illustrates an embodiment for module communication. To track and log communication events between modules, an event manager 1420 may be employed. The event manager 1420 may be a layer within the platform that handles events raised by the various modules. For instance, when module 1405 wishes to communicate with or request an exchange of data with module 1410, module 1405 may raise an event. This event and data may be routed through and handled by the event manager 1420. In contrast to other conventional event managers, such as the Flash event dispatcher, the event manager 1420 may further track and log each raised event such that event manager 1420 will maintain, for example, a record that module 1405 raised event X at time Y. All events may thus be time-stamped and tracked through the event manager 1420. A metrics module or other module 1425 may access the event manager 1420 at any given time to retrieve tracked events and associated data exchanged between the various modules. Other modules may use this tracked event data for performance optimization and debug and error reporting purposes. The event manager 1420 enables the retrieval of all events transpiring between modules from a centralized source. This arrangement eliminates the need to interrogate each separate module to obtain event data.

An embodiment using the event manager may be described as follows. A playlist or carousel module 1410 may raise an event to retrieve information regarding a music video. The event manager 1420 may receive this event and pass it to a content management system module 1405 which is listening for this event. When the content management system module 1405 receives the request to retrieve information, the module 1405 finds the requested data from a web service with which it is communicating. When data retrieval from the web service is complete, the content management module 1405 may raise an event stating that the data request is complete. This event may be passed via the event manager 1420 to the carousel or playlist module 1410. When the module 1410 receives the event, it may begin receiving the data. The event manager 1420 may enable data associated with the event to be determined, such as when the request is made, when the request is satisfied, and how long the request took to complete. Further, because the modules are not coupled (through a Flash event dispatcher or other event handler), the content management system module 1405 may be replaced by a different module without affecting the carousel or playlist module 1410. It is conceivable that multiple modules may replace module 1405 or any module on one end of a communication. For instance, two content management system modules may replace the module 1405. One module may have access to a web service concerning the music video, while a second module may have access to a different web service concerning information about the music in the music video, such as album information, album art, album or song release date, etc.

Figure 15:
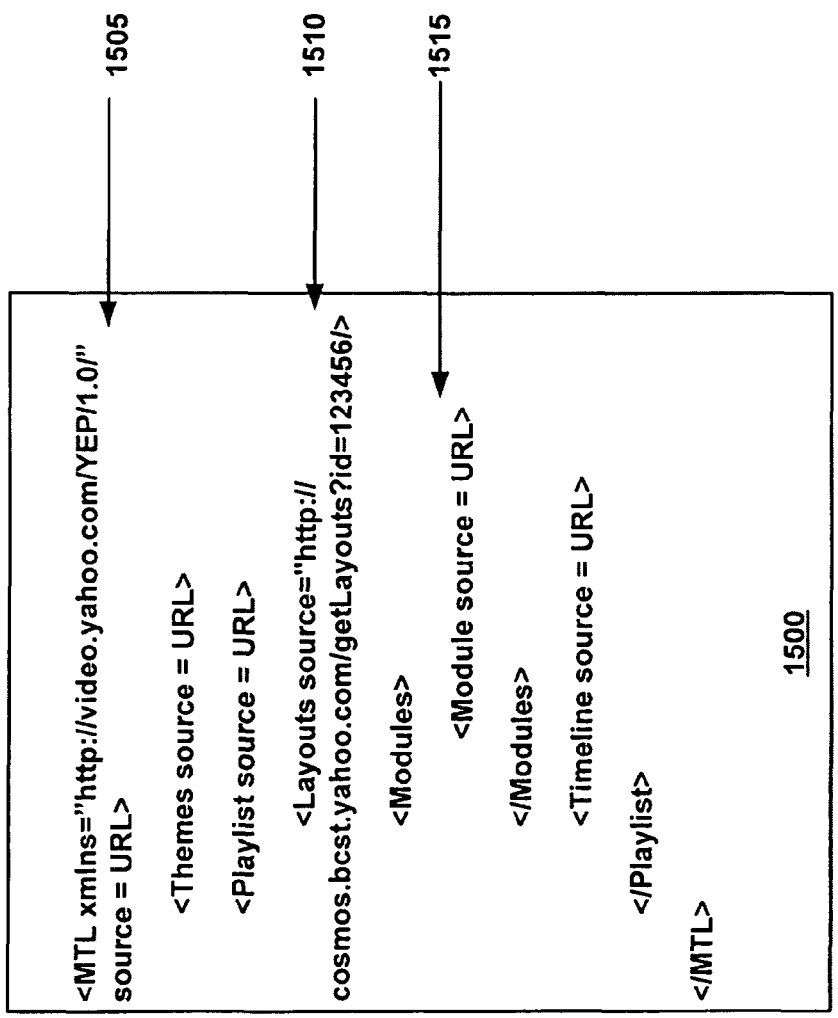
FIG. 15 illustrates a sample optimized data file for describing and configuring a media player application.

FIG. 15 illustrates a sample optimized data file for describing and configuring a media player application. The sample data file 1500 may be an XML file that describes and configures every aspect of a media player application, including themes, modules, playlists, layouts, timelines, timeline templates, metadata describing a media file, and data. In describing the aspects of the media player, the data file may become relatively large. Instead of storing a large static XML file in a server or dynamically generating the data file from a multitude of data, an optimized data file may be desired. The optimized data file may contain the minimum amount of data needed to configure a player application to operate.

The data file 1500 may be optimized by defining sources for high-level categories or items, such as themes, playlists, modules, etc. These sources may be identified by a URL, such that as the data file is parsed and compiled into the player, the content identified by the sources is retrieved. An exemplary source identifier is shown in FIG. 15 as element 1510. Source definitions need not be restricted to high-level categories. As shown in FIG. 15, a source definition 1515 may exist for a module defined at the playlist-level. A source 1505 may even be defined for the data file itself. This optimization enables the data file to be dynamic such that the resource pointed to by the source identifier may be switched as needed or desired. Further, by having the ability to change source identifiers, such as URLs, a player can be recreated dynamically after a change in a source identifier(s) so that a new player does not have to be delivered for each source change.

Optimization of a data file further may enable delivery of a new data file to a media player without reconstituting the player in a webpage. This delivery may solve the problem of how to configure or deliver new features to an already executing player without having to reinstantiate or refresh the player. One embodiment in which this capability may be advantageous is the delivery of a previously uncalled or unspecified module, such as metrics module, to an existing running player. If a metrics module is delivered to an existing running player, a developer may then have instrumentation to track the operation of the running player without having to refresh or reconstitute the player.

In another embodiment, the same player can be instantiated in a completely different form by qualifying the source URLs with a location identifier that defines a hosting page. This way the same player can be used to deliver, for example, news clips from a news source, such as Yahoo! News, and music clips from a music source, such as Yahoo! Music, with a completely different UI and functionality. Further it is to be appreciated, by using dynamically downloaded configuration, the initial player size and delivery can be drastically reduced, and modules may be loaded only on demand.

Figure 16:
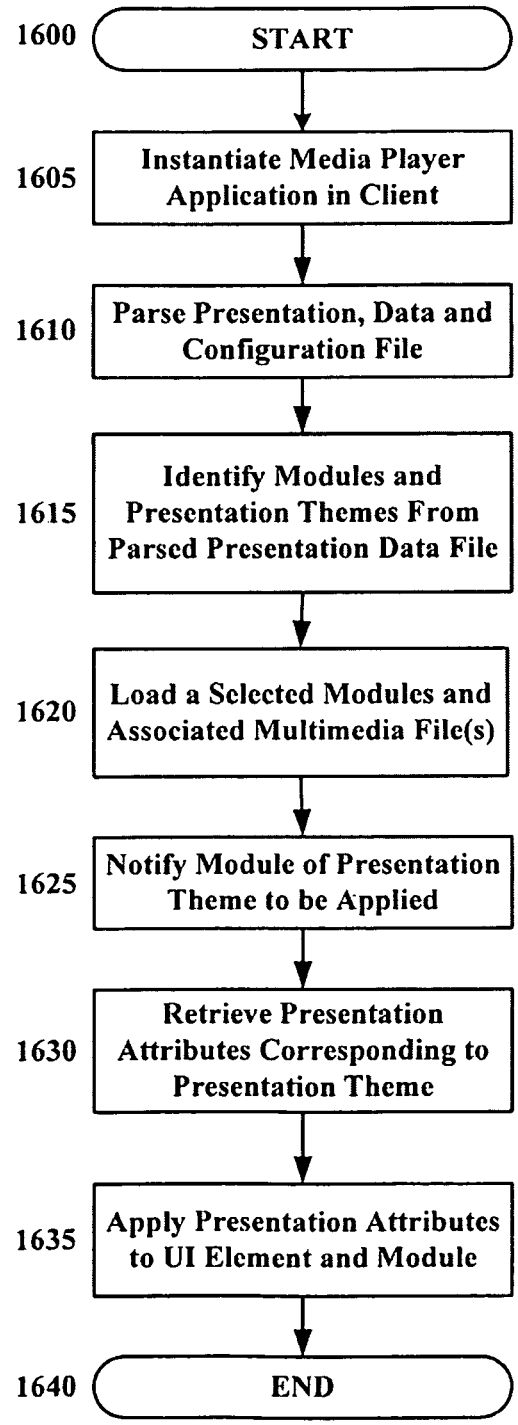
FIG. 16 is a flowchart illustrating one embodiment of a method for providing an extensible media player.

FIG. 16 is a flowchart illustrating one embodiment of a method for providing an extensible media player. In block 1605, a media player application may be instantiated in a client device or system. The media player application is capable of loading and playing one or more multimedia files simultaneously, such as video clips or audio files or executing one or more applications at the same time. In block 1610, a presentation, data, and configuration file transmitted to the client from a server may be parsed. The presentation data file may describe and configure the media player application. It is to be appreciated that the presentation data file could live anywhere, on the client itself, on the server or multiple servers and with parts of it dynamically generated based on requirements of the system. The presentation data file may specify a playlist of timelines to be loaded into the media player application, as well as modules associated with the media player application, the playlist, and individual timelines. Certain ones of these modules may specify a multimedia file or application, such as a game, to be played back by a timeline. Presentation themes may be specified in the presentation data file as well. Presentation themes may define presentation attributes for user interface (UI) elements that are located within the modules. These UI elements may include buttons, check boxes, as well as a media player display screen, playback controls, and other presentation aspects associated with the multimedia player. In block 1615, the parsed presentation data file may identify and create instances of the playlist and the playlist items corresponding to timelines. Modules and presentation themes associated with the playlist at a playlist level may be identified. Modules and presentation themes associated with specific timelines within the playlist also may be identified. In block 1620, a multimedia file identified by one of the modules associated with the playlist or the timelines in the playlist may be selected programmatically or through the presentation data file. Modules identified with the selected multimedia file may be loaded into the multimedia player application, thereby configuring the player to present the selected multimedia file. In block 1625, at the time of the modules are loaded and anytime thereafter, the media player application or the platform may notify the modules that a new or changed presentation theme or themes is to be applied to the user interface elements of the module.

In block 1630, the modules may retrieve presentation attributes from the platform using one or more functions. The module may submit a request to retrieve presentation attributes corresponding to the new presentation theme. The request may include the element type or element ID of the element to be rendered, as well as a state for the element. Presentation attributes may be returned in response to the module request. These presentation attributes may define the presentation aspects of the user interface elements, including color, background color, borders and margins, text alignment, etc. In block 1635, the modules may apply the returned and retrieved presentation attributes to their user interface elements, thereby rendering the user interface elements of the modules in a new and active theme. The process ends in block 1640.

Figure 17:
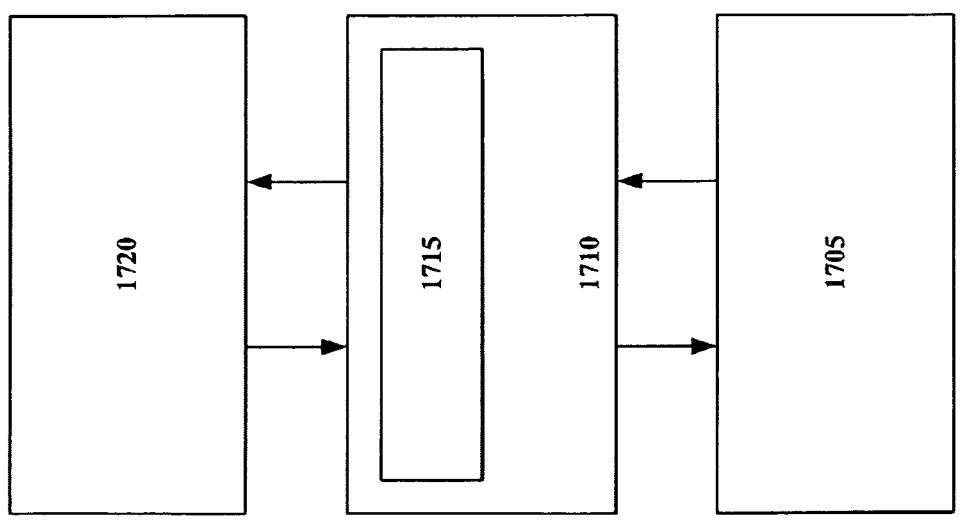
FIG. 17 illustrates an embodiment of an advertising management system.

FIG. 17 illustrates an embodiment of an advertising management system. A traditional video advertising system may require multiple round-trips between a player and the server for delivering a single ad, reporting events related to the playing of an ad to the server, and retrieving a next set of ads to be played with the next media clip or application.

These roundtrips would have to be made at runtime based on the content being played. This creates a real-time dependency between content playback and ad playback. Further interstitial ads have to be pre-configured to work in this system.

In one embodiment of the present invention, the advertising system is decoupled from the multimedia (e.g., media clips, audio files, applications) system. The advertising system may have a dedicated channel or communications path to deliver advertisements that is separate from the channel or path used to deliver media files and applications to a player. One advantage of this embodiment may be the elimination of the requirement to deliver ads while being coupled to the content delivery. The advertising system may include an Ad Manager Module, illustrated as element 1710. Because the Ad Manager Module 1710 is a module supported by the extensible media player platform 1705, the Ad Manager Module 1710 may interact directly with the platform 1705. The Ad Manager Module 1710 may execute and reside as an application-level module that is unloadable by third parties and permanently executes for an instantiated media player application. By implementing the Ad Manager Module 1710 as an application-level module, the Ad Manager Module 1710 may apply to all timelines and media clips played by the media player. Implementation of the Ad Manager Module 1710 as an application-level module also may ensure the functioning of the Ad system is unaffected by any configuration changes to the player, intentional or otherwise.

Executable code for an advertising plug-in 1715 may reside or be contained within the Ad Manager Module 1710. In essence, the Ad Manager Module 1710 may be viewed as a wrapper for the ad plug-in 1715, such that the ad plug-in is able to communicate and otherwise integrate with the platform 1705 via the Ad Manager Module 1710. When the Ad Manager Module is implemented and loaded by the media player application, the module 1710 may initialize and construct the ad plug-in 1715, thereby allowing the ad plug-in 1715 to connect to an advertising network 1720 to download advertising policies and rules as well as any scheduling information regarding advertisements. If a different version of the ad plug-in is available or desired, the Ad Manager Module 1710 could download the different version of the ad plug-in. In one embodiment, the ad plug-in may have a set of built-in advertising rules and policies. The built-in rules and policies may eliminate the need to fetch advertising policies and rules from the advertising network or server 1720. It is to be appreciated that the functionality of the ad plug-in may be easily implemented by the Ad Manager Module itself, thus eliminating the need for a separate plug-in. Further, the Ad Manager Module may have the capability to manage multiple ad plug-ins simultaneously to cater to different ad networks.

A feature of the advertising management system of the present invention is the ease with which changes to advertising policies and rules may be downloaded and implemented on a player. Further, the Ad Manager Module 1710 and the ad plug-in 1715 may enforce different ad policies and rules for different players. Ads may be scheduled against the timelines played by a media player application. As timeline events are generated and transmitted by the platform, the Ad Manager Module 1710 and ad plug-in 1715 may receive the events and determine at runtime which ads should be scheduled against the timeline or the timeline events. The Ad Manager Module 1710 and the ad plug-in 1715 may retrieve advertisements from the ad network 1720 in response to the ad schedule and flight the ads to the player for display and execution. In another embodiment the Ad Manager Module 1710 and the ad plug-in 1715 may instruct the player to display an ad at a specific point in the schedule by providing it with a resource locator URL to the advertisement. In response, the player may fetch the relevant advertisement from the network. The ad network 1720 may comprise a server, a database, any other device, repository, or location, remote or local to the Ad Manager Module, or a combination thereof. The composition of the ad network 1720 and the type of advertisements delivered by the ad network 1720 are immaterial for purposes of this disclosure and are not intended to be limited to the embodiments disclosed herein.

Figure 18:
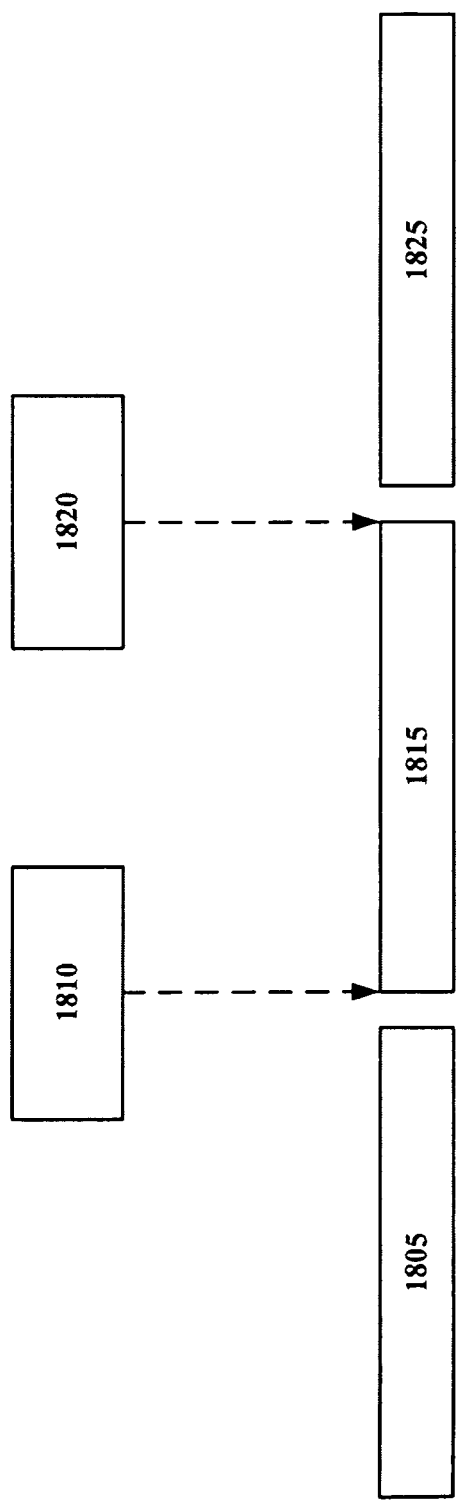
FIG. 18 illustrates an embodiment of advertisement insertion for the extensible media player.

FIG. 18 illustrates an embodiment of advertisement insertion for the extensible media player. The media player may execute a plurality of timelines, with each timeline executing or playing one or more media clips and/or applications, along with associated modules, layouts, and themes. As previously mentioned, certain modules may block the execution or playing of a timeline. The Ad Manager Module 1710 may block the execution or playing of a timeline if an advertisement is to be inserted at a predetermined point in the timeline. As shown in FIG. 18, a timeline 1805 may execute. When the timeline 1805 finishes executing, the platform 1705 may generate an event indicating that a timeline transition or change has occurred. Each module may receive this event. The Ad Manager Module 1710 and the ad plug-in 1715 may receive the timeline transition event and based on rules stored either locally or on a server provide a new pre-roll advertisement to be played or executed before a media file associated with the next timeline 1815 plays. To play the pre-roll advertisement, the Ad Manager Module 1710 may dynamically insert a blocking module 1810 into the timeline 1815 at the beginning of the timeline to prevent the media file associated with the timeline and the timeline from playing. The blocking module 1810 may assert a blocking flag or other indicator to notify the platform that the media file associated with timeline 1815 should not begin playing. After the blocking module blocks the timeline, the timeline or the platform may periodically query the blocking module and seek permission to continue executing the timeline.

The blocking module 1810 also may include code to execute and display the advertisement. When the advertisement has finished playing, the blocking module 1810 may de-assert its blocking indicator and notify the timeline that execution may resume. When the timeline is blocked, all other modules associated with the timeline may be temporarily frozen and thereby prevented from activating and executing because the modules may activate and execute in response to events that occur as a timeline or a media file associated with the timeline progresses. In one embodiment, the other modules may not even be aware that the timeline is frozen as the modules are merely waiting for a predetermined event to occur to trigger module activation and execution. As a result of the other modules being temporary frozen, no modules are able to access and use the timeline during the display and execution of an advertisement. For example, when an ad is playing, player controls may be disabled to prevent a user from skipping the ad. In another example, a user may be prevented from navigating away to a different screen in the player during ad playback.

At the end of timeline 1815, a post-roll advertisement may be scheduled to play. The Ad Manager Module 1710 may dynamically insert a blocking module 1820, such as an Ad Insert module, into the timeline 1815 at its end to prevent the next timeline 1825 from beginning to play. The post-roll advertisement may be retrieved by the Ad Manager Module and ad plug-in and delivered to the player for display. When the advertisement has finished playing, the blocking module 1820 may de-assert its blocking indicator and indicate to the timeline 1815 that it may finish executing and transition to timeline 1825.

The embodiments disclosed herein are merely exemplary and are not intended to be limiting with respect to the timeline locations or reference points at which blocking modules and advertisements may be inserted. Blocking modules and advertisements may be inserted at any point before, during, or after the execution of a timeline. An interstitial ad may be inserted at any time during the execution of a timeline or a media clip. Any of a variety of timing references may be used to determine the point at which a blocking module and an advertisement are to be inserted. For example, a blocking module and ad may be inserted after a certain number of frames of a media clip have elapsed, or after a certain percentage of a timeline has executed. Through the use of blocking modules, users and third party module developers are prevented from tampering with or skirting the playing of advertisements.

In the event a media player application becomes disconnected from the ad network 1720, the Ad Manager Module 1710 and the ad plug-in 1715 may implement offline policies and rules that enforce a static set of advertisement procedures. For example, the static ad procedures may call for the ads already delivered to the media player application to be repeated for every third timeline or every third media clip. The static ad procedures may specify whether the ads scheduled to be periodically shown are pre-roll ads (i.e., before the timeline or media clip executes), interstitial ads (i.e., during the execution of a timeline or media clip), or post-roll ads (i.e., after the timeline or media clip finishes executing). Once the media player application reconnects to the ad network 1720, the Ad Manager Module 1710 and the ad plug-in 1715 may return to dynamically scheduling and delivering advertisements to be inserted in timelines and media clips.

Along with the delivery of advertisements to a player, the Ad Manager Module 1710 or any other designated module, such as an event manager module, may serve as a metrics reporting module to report on various events and actions taken in response to a delivered advertisement. These events and actions may relate to information on, among other things, what advertisement was played for what media clip or timeline and whether a user interacted with the advertisement. In an embodiment, the event manager module may track and report on all events occurring for a player, such as events associated with timelines and their associated modules and layouts. For an advertisement-specific metrics reporting module or a global event manager module, tracked events may be stored and reported instantaneously or at a periodic interval depending on how frequently such reports are needed. In addition, multiple metrics reporting modules may be used together, such that a Yahoo! event manager may track and report ad metrics for Yahoo! purposes, while a third party metrics module may track and report ad metrics for the third party's use. If the Ad Manager Module 1710 serves as a metrics reporting module, the Ad Manager Module 1710 may only track and report those metrics associated with advertisements delivered and played for a particular media player. Any metrics reporting module associated with the present invention may be flexible enough to deliver tracked metrics to any or all of a number of servers or other remote systems. In other words, the metrics reporting module is not connected to only one reporting server; rather, the metrics reporting module may be easily configurable to deliver metrics to multiple reporting servers.

Figure 19:
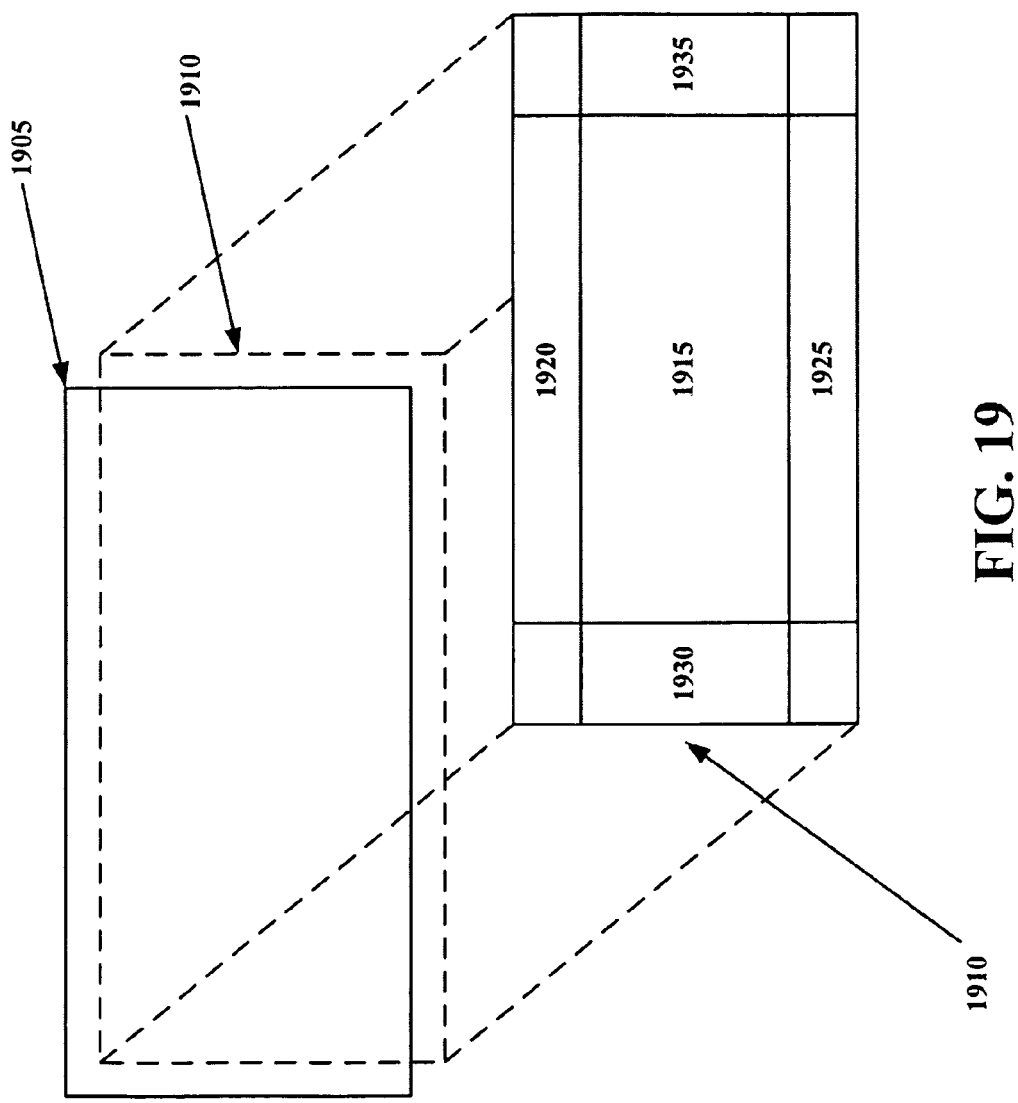
FIG. 19 illustrates an embodiment of an advertisement layout.

FIG. 19 illustrates an embodiment of an advertisement layout. As previously discussed, an advertisement delivered to a timeline for insertion may cause a blocking module, such as an Ad Insert module, to halt execution of the timeline or media clip. When the timeline is halted for insertion of an ad, a new display 1910 may be overlaid on top of the existing display module 1905 that is displaying a media clip or application. The new display 1910 may display the advertisement(s) chosen to be displayed and executed by the Ad Manager Module 1710 and the ad plug-in 1715. The new display may be further divided into multiple Ad Slot modules 1915 through 1935, which may be managed independently and dynamically by the Ad Manager Module 1710. Multiple types and sizes of advertisements may be placed within the various Ad Slot Modules 1915, 1920, 1925, 1930, 1935, depending on the type and size of the advertisement. For instance, a banner ad may be placed in any of Ad Slot modules 1920, 1925, 1930, and 1935, while a multimedia (e.g., video, audio, combination of video and audio) advertisement may be placed in Ad Slot module 1915. By using a separate display module 1910 to display ads, the ads may be quickly and easily inserted and removed at any time. Alternatively, Ad Slot modules, such as elements 1915, 1920, 1925, 1930, 1935, may be maintained or located within the layout of the media player display, such that a separate display module does not need to be overlaid on top of the media player display. In certain embodiments, a theme may be applied to the Ad Slots to apply a uniform look and feel to the new display 1910 that is consistent with the ad being displayed. The theme may include re-skinning the player via the new display 1910 to change the entire look and feel of the player to match the displayed ad.

The Ad Slot modules may each represent a layout container into which an ad may be placed for execution and display. The particular Ad Slot module in which to place an ad may be assigned by specifying an identifier associated with each Ad Slot module. This assignment may occur in the presentation data file that is parsed by the media player application. Each Ad Slot module may support multiple types of advertisements, such as banner ads, interactive ads, and multimedia ads. Since each Ad Slot module is in essence a layout container, each Ad Slot module may have pre-defined dimensions. If no Ad Slot module exists for a certain dimension (e.g., number of pixels, length by width), a new layout container of the missing dimensions may be dynamically created, and an Ad Slot module that supports advertisements may be placed inside the new layout container. Alternatively, the Ad Slot modules themselves may be resizable. Each advertisement assigned to an Ad Slot module or the Ad Slot module itself may support and offer functionality for a user to click on an advertisement or otherwise interact with an advertisement. Clicking on an ad or interacting with an ad may, among other things, cause the ad to expand to a full screen, cause an enhanced ad to be displayed, or re-direct the user to a different resource (e.g., an external website or application).

A sample presentation data file illustrating the Ad Manager Module and the Ad Slot modules is shown below:

```
<Mtl xmlns="http://video.yahoo.com/YEP/1.0/">
  <Modules>
    <!--Ad Manager Module-->
    <Module id="admanager" layoutTargetId="__none"
source="urn:mas:AdManager">
```

-continued

```
<Parameters>
    <Parameter id="mas:systemHost">http://adserver.yahoo.com/nicobar/</Parameter>
    <Parameter id="mas:accounttId">1</Parameter>
    <Parameter id="mas:ruleSetId">2</Parameter>
</Parameters>
</Module>
</Modules>
<Playlist>
<Layouts>
    <Layout id="medium" defaultContainerId="content">
    <VBox>
        <Canvas id="titlebar" minHeight="30" stretch="width" zIndex="0" backgroundColor="0x666666" />
        <HBox minHeight="300" stretch="width" zIndex="1">
            <Canvas id="playlistDisplay" minWidth="130" stretch="height" zIndex="0" backgroundColor="0xFF00FF"/>
            <Canvas zIndex="1">
    <Canvas id="content"/>
    <Canvas id="videoOverlay"/>
            </Canvas>
        <VBox minWidth="300" stretch="height" zIndex="2">
            <Canvas id="spacer" minHeight="25" />
            <Canvas id="companion300x250" zIndex="2" paddingTop="10" minHeight="300" stretch="width" backgroundColor="0xFF6600"/>
        </VBox>
        </HBox>
        <Canvas id="controls" minHeight="50" stretch="width" zIndex="2" backgroundColor="0x666666"/>
        <Canvas id="companion728x90" minHeight="90" stretch="width" zIndex="2" backgroundColor="0xFF6600"/>
    </VBox>
    </Layout>
</Layouts>
<Modules>
    <Module id="controls" layoutTargetId="controls" source="urn: Controls" />
    <Module id="playlistDisplay" layoutTargetId="playlistdisplay" source="urn: PlaylistDisplay" />
    <!--Ad Slots Modules-->
    <Module id="videoOverlayAdSlot" layoutTargetId="videoOverlay" source="urn:mas:AdSlot" />
    <Module id="companion300x250AdSlot" layoutTargetId="companion300x250" source="urn:mas:AdSlot"/>
    <Module id="companion728x90AdSlot" layoutTargetId="companion728x90" source="urn:mas:AdSlot" />
</Modules>
<TimelineTemplates>
    <Timeline id="mavenClip" defaultLayoutId="medium" defaultFullScreenLayoutId="fullscreen">
        <Modules>
        <!-- Note: AdInserts are inserted dynamically by the AdManager -->
        <!--TODO: possible to explicitly define interstitials but we have to decide if we want to allow that -->
        <!-- <Module id="interstitial_insert" layoutTargetId="_none" source="urn:mas:AdInsert" start="10"/>
        -->
        <Module id="playback" layoutTargetId="content" source="urn: VideoDisplay" isTimeSource="true" />
        </Modules>
    </Timeline>
</TimelineTemplates>
</Playlist>
</Mtl>
```

Even though the advertising management system may dynamically retrieve and flight ads to a media player application depending on when ads are scheduled against a timeline, static ad modules may be used as well to display static advertisements. These static ad modules may exist independently of the dynamic Ad Insert blocking modules and Ad Slot modules. The activation and execution of the static ad modules may be defined or specified in the presentation data file, with one or more static ad modules existing on an application-level basis (i.e., applying to all playlists), on a playlist-level (i.e., applying to all timelines for a playlist), or on a timeline-basis (i.e., applying to only one timeline). The static ads also may be controlled indirectly by the Ad Manager Module via a platform eventing system based on the content being played. For example, if a music video is played by the player, the Ad Manager Module may display static ads about musical instruments. Further, it is to be appreciated, since the static ad modules live within the constructs of the player, any action performed by the user in response to an ad can be tracked by the metrics system and appropriately actioned by the player.

Figure 20:
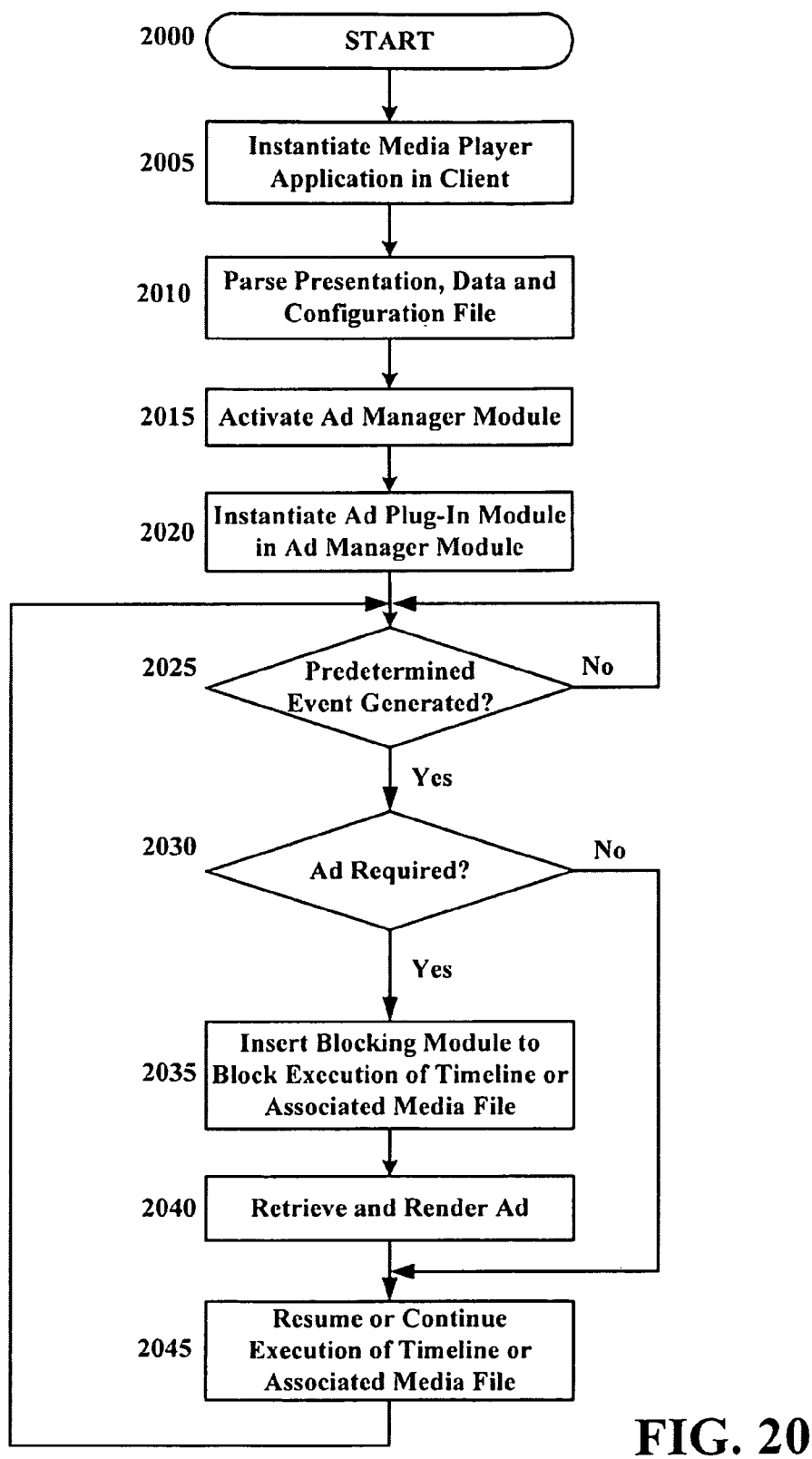
FIG. 20 is a flowchart illustrating one embodiment of a method for providing an advertising management system for an extensible media player.

FIG. 20 is a flowchart illustrating one embodiment of a method for providing an advertising management system for an extensible media player. In block 2005, a media player application may be instantiated on a client device. The media player application is capable of loading and playing one or more multimedia files simultaneously, such as video clips or audio files or executing one or more applications at the same time. In block 2010, a presentation, data, and configuration file transmitted to the client from a server may be parsed. The presentation data file may describe and configure the media player application. It is to be appreciated that the presentation data file could live anywhere, on the client itself, on the server or multiple servers and with parts of it dynamically generated based on requirements of the system. The presentation data file may specify a playlist of timelines to be loaded into the media player application, as well as modules associated with the media player application, the playlist, and individual timelines. Certain ones of these modules may specify a multimedia file or application, such as a game, to be played back by a timeline.

Presentation themes may be specified in the presentation data file as well. Presentation themes may define presentation attributes for user interface (UI) elements that are located within the modules. These UI elements may include buttons, check boxes, as well as a media player display screen, playback controls, and other presentation aspects associated with the multimedia player. In block 2015, the parsed presentation data file may activate an advertising manager module. In one embodiment, the advertising manager module may reside as an application-level module within the extensible media player. The advertising manager module may be tamperproof and incapable of being unloaded. In block 2020, the advertising manager module may instantiate an advertising plug-in. The advertising plug-in may connect to an advertising network or server to download a set of advertising policies. Advertisements to be displayed in conjunction with a timeline also may be retrieved. The advertising plug-in and the advertising manager module may dynamically schedule advertisements based on the policies. In one embodiment, the advertising plug-in may connect to the advertising network or server via a dedicated communications channels separate from the channel used to retrieve multimedia content and module data.

In block 2025, the advertising manager module may listen for certain events generated by a timeline, the platform, or a different module, that may trigger the insertion of an ad. If the event is generated by a timeline, the event may be a timeline transition, such as the end of a timeline or the beginning of a timeline. The event may be a timeline status update, such as the amount of duration remaining or elapsed for a timeline. If no notification of an event is received, the advertising manager module continues to listen. In block 2030, in response to a generated event, the advertising manager module and/or the advertising plug-in may consult with or use stored or retrieved advertising policies and rules currently defined for the player to determine whether an ad and blocking module should be inserted into the timeline in response to the generated event. An additional determination of the ad behavior also may be made by the advertising manager module and advertising plug-in. If an ad and blocking module should not be inserted into the timeline, the timeline may resume or continue playing, as illustrated in block 2045. If an ad and blocking module should be inserted in the timeline, in block 2035, if an event notification is received, the advertising manager module may insert an Ad Insert blocking module into the timeline to temporarily block or pause execution of the timeline. In block 2040, the advertising plug-in and the advertising manager module may dynamically retrieve various details for the advertisement(s) in response to the generated event. Additional advertising policies or changes to downloaded advertising policies may be retrieved as well. It is to be appreciated the nature and type of response of the Ad Manager Module and/or ad plug-in to a timeline changed event also may include contacting a remote server to determine the ad policies. This capability may permit the advertising management system to interact with legacy ad systems while still providing all additional capabilities discussed herein.

The retrieved advertisement(s) may be rendered in an advertising display module that overlays a display for the multimedia file or application being played back or executed with the timeline. The rendered advertisement may be assigned to one or more Ad Slot modules which are part of the advertising display module. Alternatively, the retrieved advertisement(s) may be rendered in the existing display for the multimedia file or application being played back or executed with the timeline. The existing display may include one or more Ad Slot modules to which the advertisement may be assigned. The advertisement and the Ad Slot modules may be clickable or otherwise interactive. While the advertisement is being displayed, an advertising metrics module may track the ad playback and any interaction by the user with the advertisement. The metrics module may store the tracked metrics data and either instantaneously deliver the metrics data to a reporting server(s) or store and periodically deliver the metrics data at a predetermined time. It is to be appreciated that during the time the user has clicked on an ad and is navigating within the ad experience, playback of the media file or timeline may be effectively stopped or paused. In block 2045, when the advertisement has finished or the user has returned from the ad experience, the blocking module may indicate to the media player platform that execution of the timeline or the media file associated with the timeline may continue or resume. The timeline and corresponding media file or application may resume execution. The method may return to block 2025 to await the generation of another event.

Those of skill in the art will appreciate that an extensible media player may be enabled to facilitate the deployment of a multi-layered dynamic media player and ad delivery system. Such a system may be implemented and deployed without the delay of a traditional product cycle. The dynamic nature of the extensible media player allows for the media player application and ad delivery system to be modified based on changing business needs and on a per view or per user basis. The present disclosure is not intended to be limited with respect to the type of media capable of being played by the extensible media player or the type of device capable of implementing the extensible media player. Moreover, the present disclosure is not intended to be limited with respect to the modules, layouts, and advertisements disclosed herein. Additional modules and layouts may be employed to add functionality to the media player application or to control an aspect of the presentation of a media file played in the media player application.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A client device, comprising:
   one or more processors; and
   an extensible media player, comprising:
      a media player application to load and play one or more multimedia files;
      an advertising manager module to dynamically schedule, retrieve, and deliver advertisements;
      a presentation data file to identify a playlist of timelines, wherein at least one multimedia file is played back during each of the timelines; and
      an advertisement display module overlaying a display of the media player application to display advertisements;
      wherein said media player application parses said presentation data file, loads the timelines, and plays the timelines sequentially; and
      wherein the advertising manager module dynamically blocks playback of a timeline and inserts an advertisement when the advertisement is scheduled to be displayed;
      wherein the media player application retrieves the advertising manager module from a server external to the media player application due to the advertising manager module being associated with the playlist of timelines in the presentation data file.

2. The client device of claim 1, wherein the advertising manager module retrieves advertisements using a dedicated communications channel.

3. The client device of claim 1, wherein the advertising manager module includes an advertising plug-in to retrieve and schedule the advertisements.

4. The client device of claim 1, wherein the advertising manager module includes multiple advertising plug-ins that are managed simultaneously by the advertising manager module, the multiple advertising plug-ins each communicating with a different advertising server and retrieving and scheduling a different set of advertisements.

5. The client device of claim 1, further comprising a metrics reporting module to track and report advertising metrics data to a reporting server.

6. The client device of claim 1, wherein the advertising display module includes one or more advertising slot modules, and wherein the advertisement is dynamically assigned to the one or more advertising slot modules.

7. The client device of claim 1, wherein the advertising manager module retrieves advertising policies and rules and dynamically schedules the advertisements based on the advertising policies and rules.

8. The client device of claim 1, wherein the advertising manager module dynamically blocks the timeline and inserts the advertisement in response to a timeline event.

9. The client device of claim 8, wherein the advertising manager module consults with an advertising plug-in to determine a response to the timeline event.

10. The client device of claim 8, wherein the advertising manager module and an advertising plug-in consult with an advertising server to determine a response to the timeline event.

11. The client device of claim 8, wherein the advertising manager module dynamically blocks the timeline by inserting a blocking module into the timeline.

12. The client device of claim 2, wherein if the advertising manager module is disconnected from the dedicated communications channel, then the advertising manager module implements static ad policies for the timelines.

13. The client device of claim 12, wherein the static ad policies include displaying already delivered advertisements in a periodic static interval.

14. A method, comprising:
    instantiating a multimedia player application on a client system;
    receiving, at the client system, from a server, a presentation data file that includes a playlist of timelines and an association of an advertising manager module with the playlist of times, wherein at least one multimedia file is played back during each of the timelines;
    parsing the presentation data file to activate the advertising manager module;
    retrieving the advertising manager module from a particular server external to the multimedia player application in response to a determination that the advertising manager module is associated with the playlist of timelines in the presentation data file;
    instantiating, in the advertising manager module, an advertising plug-in that connects with an advertising network to download advertising policies and dynamically schedule advertisements based on the advertising policies;
    in response to an event generated by a timeline, inserting a blocking module into the timeline to block execution of the timeline;
    while the execution of the timeline is blocked, retrieving and rendering an advertisement in an advertising display module overlaying a display of the multimedia player application; and
    upon conclusion of the advertisement, resuming execution of the timeline.

15. The method of claim 14, further comprising assigning the rendered advertisement to at least one advertising slot module of the advertising display module.

16. The method of claim 14, further comprising tracking playback of the advertisement and reporting advertisement metrics to at least one reporting server.

17. The method of claim 14, further comprising connecting the advertising plug-in with the advertising network via a dedicated communications channel.

18. The method of claim 14, further comprising, if the advertising plug-in disconnects from the advertising network, implementing a static ad policy for the timelines.

19. The method of claim 18, wherein the static ad policy displays previously retrieved advertisements in a periodic interval for the timelines.

20. The method of claim 14, further comprising, in response to the generated timeline event, retrieving, by the advertising plug-in, new advertising policies.

21. A multimedia presentation system, comprising:
    a content server storing a presentation data file, a plurality of multimedia files, a plurality of modules, and a plurality of presentation themes;
    an advertising server storing advertising policies and advertisements;
    a client, configured to communicate with said content server and said advertising server, comprising a processing unit and a memory unit, said memory unit storing instructions adapted to be executed by the processing unit to:
        instantiate a multimedia player application on a client system;
        receive, from the content server, a presentation data file that includes a playlist of timelines and an association of an advertising manager module with the playlist of timelines, wherein at least one multimedia file is played back during each of the timelines;
        parse the presentation data file to activate the advertising manager module;
        retrieve the advertising manager module from a particular server external to the multimedia player application in response to a determination that the advertising manager module is associated with the playlist of timelines in the presentation data file;
        instantiate, in the advertising manager module, an advertising plug-in, the advertising plug-in connecting with the advertising server to download a subset of the advertising policies and dynamically schedule a subset of the advertisements based on the subset of the advertising policies;
        in response to an event generated by a timeline:
            insert, using the advertising manager module, a blocking module into the timeline to block execution of the timeline;
            while the execution of the timeline is blocked, retrieve and render an advertisement in an advertising display module overlaying a display of the multimedia player application; and
            upon conclusion of the advertisement, resume execution of the timeline.

22. The system of claim 21, wherein the rendered advertisement is assigned to at least one advertising slot module of the advertising display module.

23. The system of claim 21, wherein playback of the advertisement is tracked and advertisement metrics are reported to at least one reporting server.

24. The system of claim 21, wherein the advertising plug-in connects with the advertising server via a dedicated communications channel.

25. The system of claim 21, wherein, if the advertising plug-in disconnects from the advertising server, a static ad policy is implemented from among the advertising policies for the timelines.

26. The system of claim 25, wherein the static ad policy displays previously retrieved advertisements in a periodic interval for the timelines.

27. The system of claim 21, wherein, in response to the generated timeline event the advertising plug-in retrieves new advertising policies.

* * * * *